(12) United States Patent
Sawayanagi et al.

(10) Patent No.: US 8,164,770 B2
(45) Date of Patent: Apr. 24, 2012

(54) IMAGE PROCESSING APPARATUS AND IMAGE PROCESSING SYSTEM WITH REMOTE LOGIN

(75) Inventors: Kazumi Sawayanagi, Itami (JP); Toshihiko Otake, Ikeda (JP); Hideyuki Matsuda, Suita (JP); Masao Hosono, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 33 days.

(21) Appl. No.: 12/720,359

(22) Filed: Mar. 9, 2010

(65) Prior Publication Data

US 2010/0231950 A1 Sep. 16, 2010

(30) Foreign Application Priority Data

Mar. 10, 2009 (JP) .................................. 2009-56918

(51) Int. Cl.
*G06K 15/00* (2006.01)
(52) U.S. Cl. ....... 358/1.14; 358/1.1; 358/1.15; 358/402; 358/474; 358/1.13; 715/740; 709/203
(58) Field of Classification Search .................. 358/1.15, 358/1.1, 402, 474, 1.14, 1.13; 715/740; 709/203
See application file for complete search history.

(56) References Cited

U.S. PATENT DOCUMENTS

| 2003/0052907 A1* | 3/2003 | Rekimoto | 345/700 |
| 2007/0171436 A1* | 7/2007 | Manchester | 358/1.1 |
| 2008/0084575 A1* | 4/2008 | Dantwala | 358/1.15 |
| 2008/0288879 A1 | 11/2008 | Tomita et al. | |
| 2010/0058194 A1* | 3/2010 | Owen | 715/740 |

FOREIGN PATENT DOCUMENTS

| JP | 10-150521 | 6/1998 |
| JP | 2005-86555 | 3/2005 |
| JP | 2008-269530 | 11/2008 |
| JP | 2008-286978 | 11/2008 |

OTHER PUBLICATIONS

Japanese Notification of Reasons for Refusal mailed on Nov. 16, 2010, directed to counterpart Japanese Patent Applicaton No. 2009-056918; 5 pages.

* cited by examiner

*Primary Examiner* — Benny Tieu
*Assistant Examiner* — Martin Mushambo
(74) *Attorney, Agent, or Firm* — Morrison & Foerster LLP

(57) ABSTRACT

An image processing apparatus is connected via a network to a terminal device having a recording medium loaded therein, receives a remote login from the terminal device, and executes an image processing job. When an operator who has logged in to the image processing apparatus is the same person as a user who is remotely logged in to the image processing apparatus from the terminal device, the image processing apparatus performs one of operations A and B after the image processing apparatus is granted access permission by the terminal device with use of a network address of the terminal device, which is acquired upon the remote login, the operation A being to acquire an image file stored in the recording medium, the operation B being to cause an image file stored in the apparatus to be stored in the recording medium.

14 Claims, 16 Drawing Sheets

FIG. 3
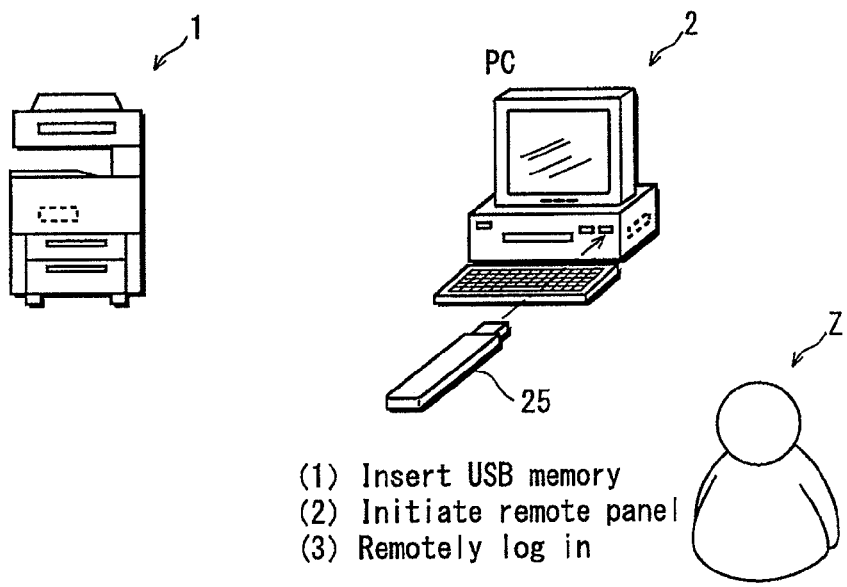
(1) Insert USB memory
(2) Initiate remote panel
(3) Remotely log in
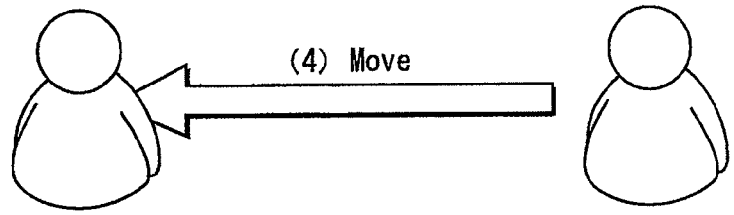
(5) Log in via operation panel
(6) Select memory printing
(7) Select storage from which file should be acquired
(8) Select file stored in USB memory
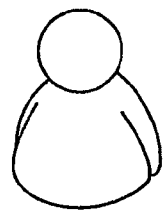
(9) USB memory job
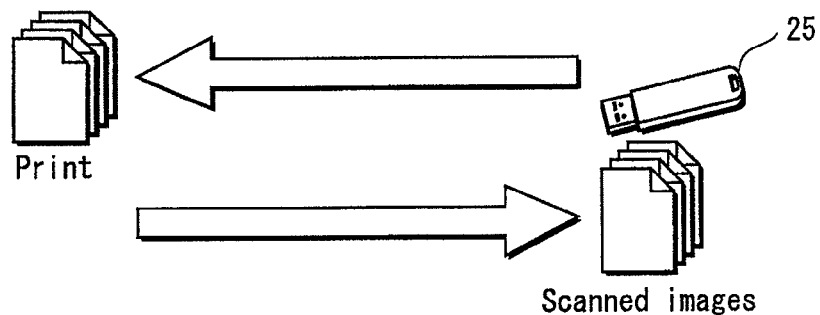
Print
Scanned images Embodiment example Comparative example

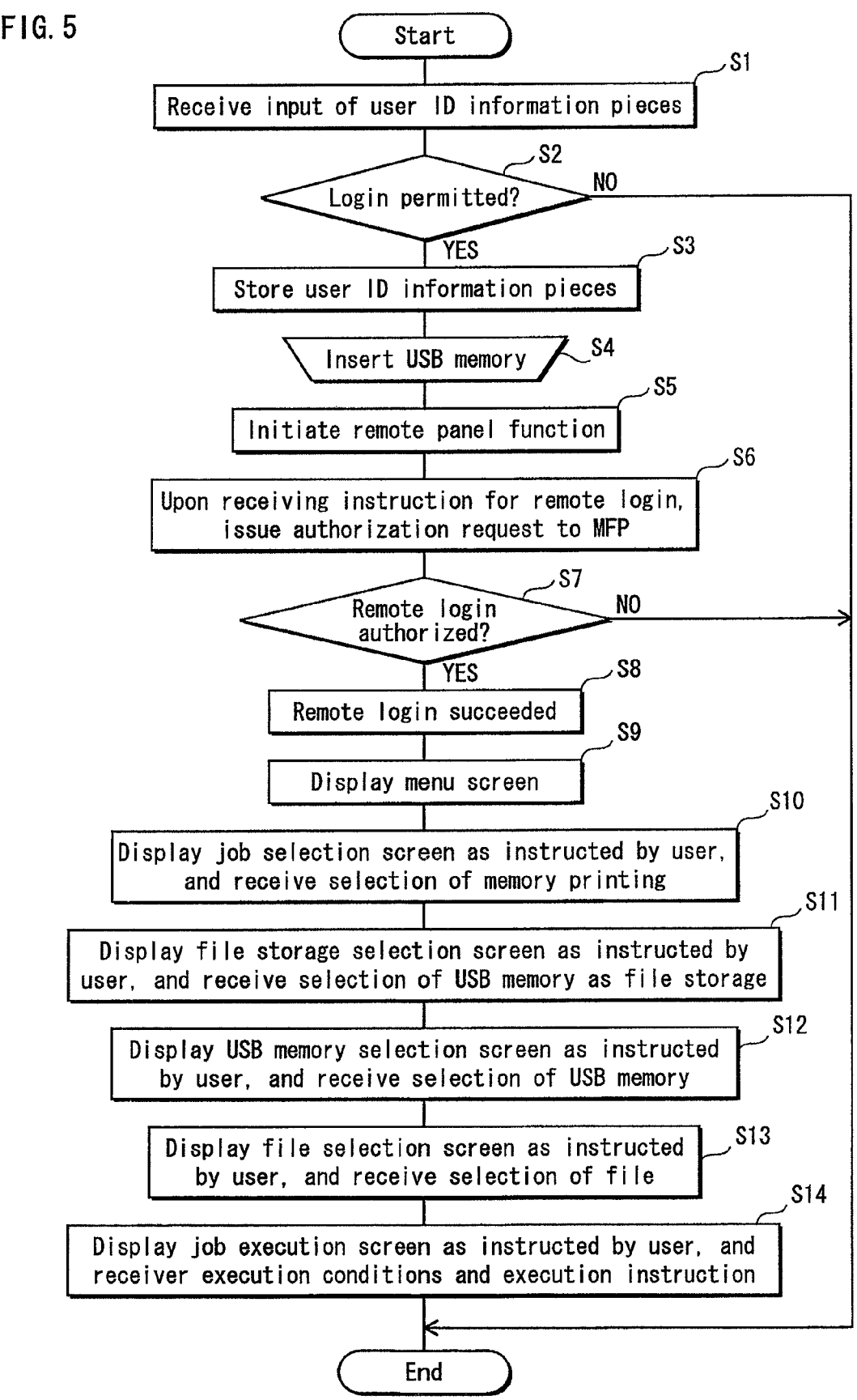

| No | ID | Password | Request source | Network address | Login time |
|---|---|---|---|---|---|
| 1 | 123 | **** | Own apparatus | — | 11:10 |
| 2 | 123 | **** | PC2 | 123*** ··· | 11:00 |
| 3 ... | . . | . . | . | . | . |

152

| External terminal | USB memory | Shared password | User name |
|---|---|---|---|
| PC2 | F:USB······ | **** | Z |
| . . | . . | . . | . . |

IMAGE PROCESSING APPARATUS AND IMAGE PROCESSING SYSTEM WITH REMOTE LOGIN

This application is based on an application No. 2009-056918 filed in Japan, the contents of which are hereby incorporated by reference.

BACKGROUND OF THE INVENTION (1) Field of the Invention

The present invention relates to an image processing apparatus that is connected to a terminal device via a network and receives a remote login from the terminal device, and to an image processing system including such an image processing apparatus.

(2) Description of the Related Art

An image processing system with a remote panel function has been proposed. This image processing system includes a photocopier (an example of an image processing apparatus) and a personal computer or PC (an example of a terminal device) that are connected to each other via a network. The remote panel function enables a user of the PC to remotely log in to the photocopier from the PC via the network, and remotely operate the photocopier from the PC. While the user of the PC is remotely logged in to the photocopier, the remote panel function allows displaying, onto the display of the PC, an operation screen that is substantially identical to an operation panel of the photocopier. This way, the user of the PC can input a job (copy, scan, etc.) and execution conditions for executing the job (selecting a printing sheet, etc.) via the operation screen, to cause the photocopier to execute the job. That is, the user of the PC can instruct the photocopier to execute the job from the PC, as if the user is operating the photocopier right in front of the photocopier.

The above-described remote panel function also makes it possible to cause the photocopier to execute printing based on a file (an image, etc.) stored in a recording medium connected to the PC using, for example, a Universal Serial Bus (USB) (hereinafter, the recording medium is called "USE memory", and this type of printing is referred to as "memory printing"). In order to execute memory printing from the PC, the user needs to remotely log in to the photocopier, then perform various operations (selecting a printing sheet, etc.) via the operation screen displayed on the display of the PC.

At this time, if a printing sheet of a desired size is not set in the photocopier, the user needs to suspend the input operation on the PC, go to the front of the photocopier, and set a printing sheet of the desired size in the photocopier.

Once the printing sheet has been set, the user must return to the PC and resume the operation for the memory printing, which had been suspended. Upon execution of the printing, the printed sheet is output. Thereafter, the user again needs to go to the photocopier to pick up the output printed sheet. Having to take such a back-and-forth trip is a hassle for the user. One way to avoid this hassle is to abandon the remotely-operated memory printing, and instead to execute printing by operating the photocopier right in front of the photocopier, using another method different from the remote operation. For example, one possible method is to utilize a pull printing function of the photocopier.

The pull printing function allows the user who is at the photocopier to (i) acquire an image file that is shared between the photocopier and the PC using known file-sharing protocol, such as Server Message Block (SMB) protocol, and (ii) execute printing based on the acquired image file. When the pull printing function is selected, the operation panel of the photocopier displays a screen for accessing the PC.

Then, the user needs to input the following information via the screen displayed on the operation panel: a network address of the PC, a user name and a password that are used when logging in to the PC, etc. However, the problem is, the user cannot perform this input operation unless he/she knows necessary information (e.g., the network address of the PC). Moreover, even if the user knows such necessary information, the following problem still exists. In general, an operation panel of a photocopier only has number buttons. To input characters such as alphabets, the user has to cause a liquid crystal display to show a touchscreen via which he/she can input alphabets. Therefore, every time the user attempts to input different information (the network address of the PC, the user name, etc.), the user must not only switch between different input screens, but also input characters by touching them one by one. Such an input operation is a troublesome task.

The above problems are not only byproducts of memory printing. The above problems also occur when remotely executing a scan job, or more specifically, in the following case.

To execute a scan job, a user performs the following operations at the PC: (i) selecting a scan job via a remote panel; (ii) specifying a recording medium loaded in the PC, into which an image data to be read should be stored, and (iii) inputting a level of darkness at which the document should be read, etc. Thereafter, the user (i) goes to the photocopier, (ii) sets the document on a scanner of the photocopier, (iii) returns to the PC, and (iv) starts the scan job via the remote panel. Consequently, data of the image read by the scanner of the photocopier is transmitted to the PC and stored into the recording medium loaded in the PC.

When following the above procedure, there may be a case where the user, who has come to the photocopier, needs to go to a location different from a location of the PC. In this case, once the document has been set, it is preferable that the user start the scan job at the photocopier without returning to the PC, and after the document has been read, head to said different location, carrying the document with him/her. One way to execute the scan job without the user returning to the PC is to use a method called Scan To SMB. As with the aforementioned pull printing, the Scan To SMB enables the user to specify a recording medium loaded in the PC as a file into which a read image should be stored, in accordance with share settings that are in effect between the photocopier and the PC. However, the Scan To SMB also requires the user to go to the trouble of performing the same input operation as in the case of the aforementioned pull printing.

SUMMARY OF THE INVENTION

It is an object of the present invention to provide an image processing apparatus and an image processing system with improved operability, due to which a user can easily execute an image processing job, such as printing an image file stored in a recording medium connected to a terminal device.

In view of the above object, one aspect of the present invention is an image processing apparatus that (i) is connected via a network to a terminal device having a recording medium loaded therein, (ii) receives a remote login from the terminal device, and (iii) executes an image processing job, the image processing apparatus comprising: a storage part that stores therein (i) a network address of the terminal device and (ii) identification information pieces of a user who has requested the remote login, which are both acquired upon the remote login; an input part operable to receive, from an operator, (i) an operator login and (ii) input for instructing the job; an acquisition part operable to acquire identification information pieces of the operator who has performed the operator login; a judgment part operable to, based on the identification information pieces of the user and the operator, judge whether or not the operator is the same person as the user who is remotely logged in to the apparatus from the terminal device; and a file operation part operable to, when the judgment is affirmative, perform one of operations A and B according to the input after the apparatus is granted access permission by the terminal device with use of the network address, the operation A being to acquire an image file stored in the recording medium, the operation B being to cause an image file stored in the apparatus to be stored in the recording medium.

In view of the above object, another aspect of the present invention is an image processing system including a terminal device having a recording medium loaded therein and an image processing apparatus that is connected to the terminal device via a network, receives a remote login from the terminal device and executes an image processing job, the image processing apparatus comprising: a storage part that stores therein (i) a network address of the terminal device and (ii) identification information pieces of a user who has requested the remote login, which are both acquired upon the remote login; an input part operable to receive, from an operator, (i) an operator login and (ii) input for instructing the job; an acquisition part operable to acquire identification information pieces of the operator who has performed the operator login; a judgment part operable to, based on the identification information pieces of the user and the operator, judge whether or not the operator is the same person as the user who is remotely logged in to the apparatus from the terminal device; and a file operation part operable to, when the judgment is affirmative, perform one of operations A and B according to the input after the apparatus is granted access permission by the terminal device with use of the network address, the operation A being to acquire an image file stored in the recording medium, the operation B being to cause an image file stored in the apparatus to be stored in the recording medium.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 illustrates a procedure of operations performed by a user when using the image processing system;

FIG. 5 is a flowchart of processing performed by the PC;

FIG. 7 shows exemplary contents of a login information table stored in the MFP;

DESCRIPTION OF THE PREFERRED EMBODIMENT

The following describes an embodiment of an image processing apparatus and an image processing system pertaining to the present invention, with reference to the accompanying drawings.

<Structure of Image Processing System>

Figure 1:
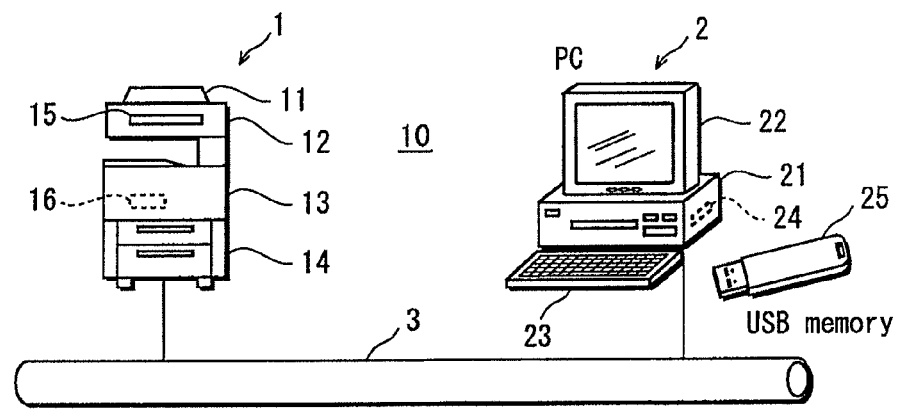
FIG. 1 shows the structure of an image processing system including a terminal device and an image processing apparatus.

FIG. 1 shows the structure of an image processing system 10 including an image processing apparatus 1 and a terminal device 2. As shown in FIG. 1, the image processing system 10 is structured in such a way that the image processing apparatus 1, the terminal device 2, and the like are connected to one another via a network (here, a Local Area Network (LAN)). The image processing apparatus 1, the terminal device 2, and the like can exchange various types of data with one another.

The image processing apparatus 1 is a multifunction digital photocopier (hereinafter referred to as a "MultiFunction Peripheral (MFP)"). Main structural elements of the image processing apparatus 1 are: an automatic document feeder 11; an image reader 12; an image former 13; a feeder 14; an operation panel 15; and a controller 16.

The automatic document feeder 11 feeds a document that has been set in the MFP 1 to a read position in which the image reader 12 is to read the document.

The image reader 12 reads an image of the document fed by the automatic document feeder 11.

The image former 13 executes an image forming (printing) operation using conventional xerography.

The feeder 14 stores one or more sheets to be provided for an image forming operation. When the image formation operation is performed, the feeder 14 feeds said one or more sheets stored therein to the image former 13, one sheet at a time.

The controller 16 collectively controls operations of the automatic document feeder 11, the image reader 12, the image former 13 and the feeder 14. The controller 16 then receives and executes various types of jobs, such as a scan job of reading the image of the document, and a copy job of printing the read image on a sheet. The controller 16 also receives a remote login from the external terminal device 2, and executes a job that has been remotely instructed by the terminal device 2 (e.g., memory printing). From the moment the remote login is authorized, the MFP 1 and the terminal device 2 establish communication between each other until the terminal device 2 logs out of the MFP 1.

The operation panel 15 is composed of, for example, a copy start button, number buttons for setting the number of print sets, and a liquid crystal display on the surface of which a touchscreen is mounted, the liquid crystal display featuring a Graphical User Interface (GUI) and the like. The operation panel 15 displays necessary screens as instructed by the controller 16, receives operator's inputs via the number buttons and the touchscreen, and transfers the received/input information to the controller 16.

The terminal device 2 is a personal computer (hereinafter, simply "PC") comprising a body 21, a display 22, a keyboard 23, etc. The terminal device 2 is connected to the MFP 1 and other terminals via a LAN 3 using existing communication protocol (Transmission Control Protocol (TCP), Internet Protocol (IP), etc.), and exchanges data with the MFP 1 and other terminals.

The body 21 has an interface for connecting to USB memory 25, which is one example of a removable recording medium. A controller 24 in the body 21 can, for example, read out an image file stored in the USB memory 25 and write a new image file to the USB memory 25 via the interface. It should be mentioned here that any USB memory has prerecorded therein its name or the like for identifying itself as USB memory. When USB memory is connected to the PC 2, the PC 2 can identify (i) that it is USB memory, and (ii) its name or the like.

Here, the image file denotes a file of data that is used to produce an image. Therefore, the term "image file" is not limited to indicating bitmap image data, but encompasses a file of data that is ultimately used to display or form an image on a display or a sheet (e.g., data created by application software designed to create documents and the like on a PC). Hereinafter, the image file is simply referred to as a "file".

When the USB memory 25 is connected to the PC 2, the PC 2 can cause the MFP 1 to execute memory printing while remotely logging in to the MFP 1. The PC 2 may be structured such that it can be connected to one USB memory 25, or a plurality of USB memories 25. Although not illustrated in FIG. 1, the MFP 1 also has an interface for connecting to the USB memory 25. A controller 16 in the MFP 1 can cause execution of various functions, such as functions of reading out a file stored in the USB memory 25, printing the read file, and storing an image that has been read through a scan job into the USB memory 25.

<Structures of Controllers in MFP and PC>

Figure 2:
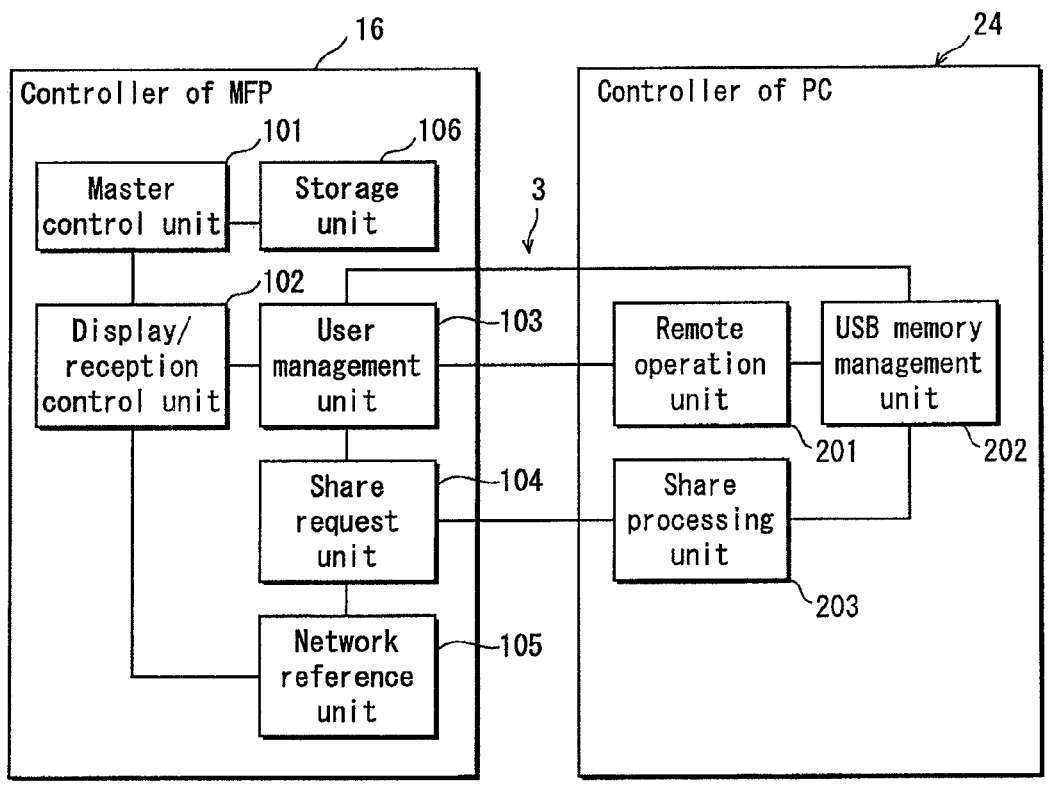
FIG. 2 is a block diagram showing structures of a controller included in an MFP (representing the image processing apparatus) and a controller included in a PC (representing the terminal device)

FIG. 2 is a block diagram showing structures of the controller 16 in the MFP 1 and the controller 24 in the PC 2. Note, FIG. 2 selectively shows only structural elements of the MFP 1 and PC 2 that relate to memory printing.

As shown in FIG. 2, the controller 16 is composed of a master control unit 101, a display/reception control unit 102, a user management unit 103, a share request unit 104, a network reference unit 105, a storage unit 106, etc.

The display/reception control unit 102 performs such control operations as (i) displaying, on the liquid crystal display of the operation panel 15, a screen (not illustrated) via which the MFP 1 receives a login from an operator who is right in front of the operation panel 15, as well as various other screens (described later), and (ii) receiving instructions from the operator via the displayed screens.

The user management unit 103 manages permission information pieces that show, in one-to-one association, users who are permitted to log in to the own apparatus (MFP 1). By way of example, the permission information pieces are identification (ID) information pieces of the users; more specifically, they show user IDs and passwords of the users. When a user requests a login, the user management unit 103 permits the login only when the user ID and password input by this user (requestor of the login) are included in the permission information pieces. This term "login" encompasses both a login via the operation panel 15 and a remote login from the PC 2. The user management unit 103 can also judge whether the operator who has logged in to the MFP 1 via the operation panel 15 is the same person as the user who is remotely logged in to the MFP 1 from the PC 2.

The share request unit 104 requests a share processing unit 203, which is in the controller 24 of the PC 2, to permit sharing of the USB memory 25 connected to the PC 2 between the MFP 1 (the own apparatus) and the PC 2. Here, the share request unit 104 requests sharing of the USB memory 25 using SHE protocol. In response to this request, the PC 2 transmits, to the MFP 1, a password or the like that serves as a condition for permitting SMB-protocol-aided sharing (described later).

The network reference unit 105 can not only access the PC 2 using the password transmitted from the PC 2, but also refer to or search the shared USB memory 25, as well as a file or the like stored in the shared USB memory 25, by using SMB protocol. Note, the SMB protocol may be replaced by other protocols that enable file sharing between different devices.

The storage unit 106 stores therein a login information table (described later), etc.

The master control unit 101 causes execution of memory printing while collectively controlling the display/reception control unit 102, the user management unit 103, the share request unit 104 and the network reference unit 105.

The controller 24 in the PC 2 is composed of a remote operation unit 201, a USB memory management unit 202, the share processing unit 203, etc.

The remote operation unit 201 performs a remote panel function. To be more specific, in accordance with instructions from the user, the remote operation unit 201 displays various types of screens via which the remote panel function is performed. Although not illustrated in the drawings, examples of such screens include: a remote request screen, via which the user requests a remote login to the MFP 1; and a remote operation screen, via which the MFP 1 receives job execution conditions and a job execution instruction from the user after the user has remotely logged in to the MFP 1. The remote operation unit 201 also receives inputs and instructions from the user via these screens, and requests the MFP 1 to execute the instructed job.

Once the share processing unit 203 has received the share request from the share request unit 104 in the MFP 1, the share processing unit 203 generates a temporal password, provides the USB memory management unit 202 with the temporal password, and notifies the USB memory management unit 202 that the share request has been made.

Once the USB memory management unit 202 has received the temporal password and the notification of the share request from the share processing unit 203, the USB memory management unit 202 manages the received temporal password as a condition for permitting sharing of the USB memory 25, and transmits the temporal password to the user management unit 103 in the MFP 1.

<Procedure of User Operations>

Assume a case where a particular user (hereinafter, "user Z"), who is operating the PC 2 structured in the above-described manner to execute memory printing, has to go over to the MFP 1 structured in the above-described manner. The following describes the procedure of the operations that the user Z has to perform in this case, with reference to FIGS. 3, 4A and 4B.

As shown in FIG. 3, the user Z (1) inserts the USB memory 25 into the PC 2, (2) initiates the remote panel function on the PC 2, and (3) performs an input operation via the remote request screen, to remotely log in to the MFP 1. Once the user Z has successfully accomplished the remote login, the user Z performs another input operation via the remote operation screen, to cause execution of memory printing. Specifically, this input operation includes: selecting the number of print sets and a sheet size; and specifying a file to be printed from among a group of files stored in the USB memory 25.

(4) In the midst of the above input operations (while the user Z is remotely logged in), the user Z goes over to the front of the MFP 1 as necessary (e.g., when it is required to set a desired sheet in the MFP 1).

(5) Once the user Z has set the desired sheet in the MFP 1, the user Z logs in to the MFP 1 via the operation panel 15 of the MFP 1. Upon the login, a job selection screen 111 (FIG. 4A) is displayed on the liquid crystal display of the operation panel 15.

Figure 4A:
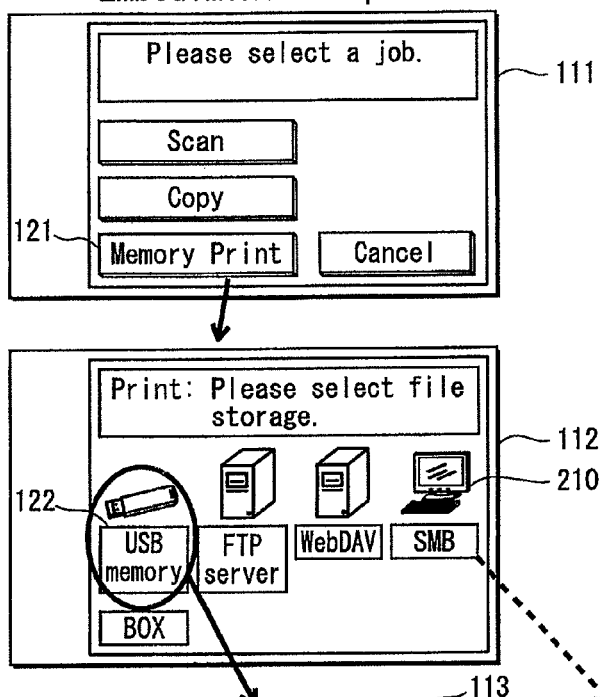
FIGS. 4A and 4B show examples of screens displayed on an operation panel of the MFP.

(6) The user Z touches (selects) a memory print button 121 on the job selection screen 111. Upon this selection, the job selection screen 111 on the liquid crystal display of the operation panel 15 is switched to a file storage selection screen 112 (FIG. 4A).

(7) The user Z selects a USB memory button 122 on the file storage selection screen 112. Upon this selection, a USB memory selection screen 113 is displayed (FIG. 4A).

(8) The user Z selects a PC/USB memory button 123 on the USB memory selection screen 113. Upon this selection, the USB memory selection screen 113 is switched to a file selection screen 114 (FIG. 4A). Buttons 124 are displayed on the file selection screen 114 as icons. These buttons 124 show ID information pieces (in FIG. 4A, file names) of files stored in the USB memory 25 connected to the PC 2.

The user Z can select, from among a group of files displayed, a file he/she wants to print. Upon this selection, the file section screen 114 is switched to a memory print execution screen (not illustrated). Via this memory print execution screen, the user Z inputs job execution conditions and instructs job execution. Here, the user Z can instruct the job execution after, for example, selecting a sheet or setting the number of print sets.

(9) Once the user Z has instructed the job execution, the MFP 1 (i) acquires the file selected on the file selection screen 114, which has been described in the above (8), from the USB memory 25 connected to the PC 2 via the LAN 3, and (ii) executes memory printing in accordance with the acquired file. After the memory printing has been completed, the user Z can obtain the printed sheet output from the MFP 1.

Figure 4B:
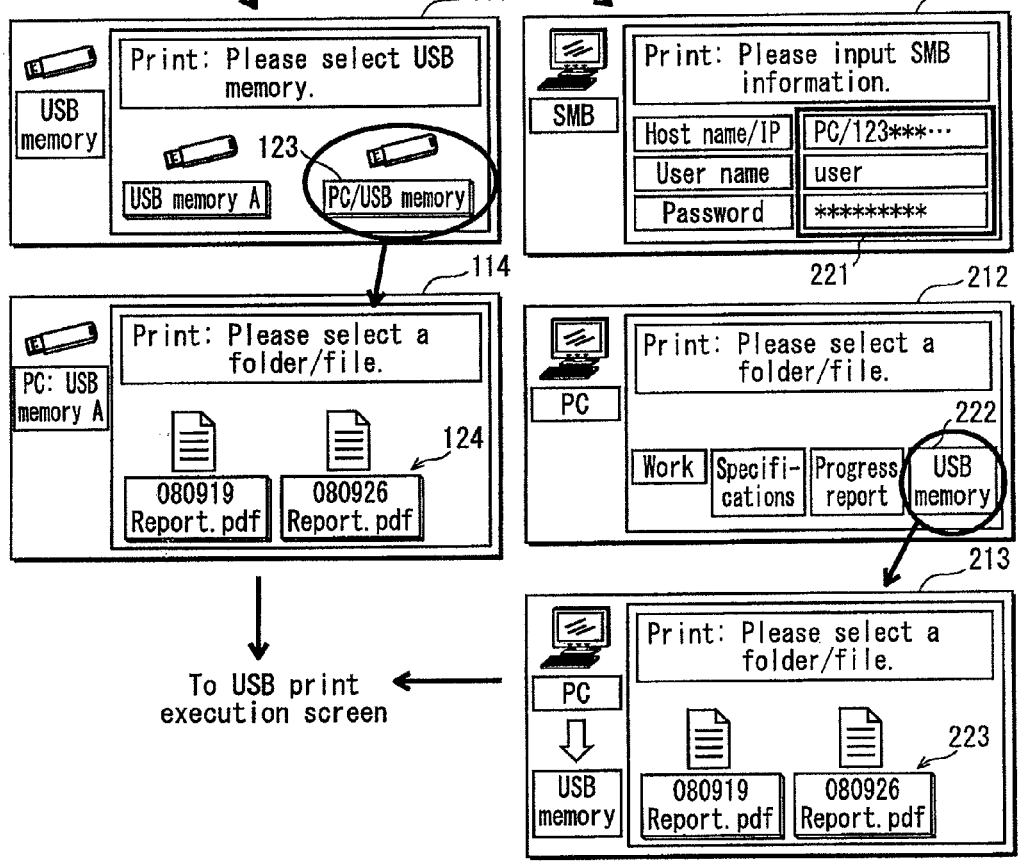

FIG. 4B shows a comparative example (conventional method). Conventionally, the user Z does not select the USB memory button 122 but selects an SMB button 210 on the file storage selection screen 112. This is because the conventional USB memory button 122 only represents USB memory connected to the own apparatus (MFP 1). Hence, selecting the conventional USB memory button 122 would cause the USB memory selection screen 113 to only display a button for USB memory A connected to the MFP 1; the PC/USB memory button 123 would not be displayed. In other words, a conventional MFP is not configured to allow a user to select the USB memory 25 attached to the PC 2 on the USB memory selection screen 113.

Once the user Z has selected the SMB button 210 on the file storage selection screen 112, the MFP 1 begins file acquisition processing using the aforementioned pull printing function. This pull printing function is independent of and different from the memory printing which involves a remote login from the PC 2.

The file storage selection screen 112 is switched to an SMB information screen 211 shown in FIG. 4B. The user Z can input a host name, network address, user name and password into entry fields 221 on the SMB information screen 211. When SMB-protocol-aided communication has been successfully established between the MFP 1 and the PC 2 based on the input information, the SMB information screen 211 is switched to a folder selection screen 212. The folder selection screen 212 displays icons of a group of folders that are configured as shared in the PC 2.

Once the user Z has selected, from among the group of shared folders, a USB memory button 222 representing the USB memory 25, the folder selection screen 212 is switched to a file selection screen 213, which is substantially identical to the file selection screen 114. The user Z can select, from among a group of files displayed, a file 223 to be printed.

As set forth above, in the comparative example, once the user Z has moved from the PC2 to the MFP 1, the user can select a file stored in the USB memory 25 connected to the PC 2 only after he/she has thoroughly performed an input operation for accessing folders shared using SMB protocol at the MFP 1.

On the other hand, in the embodiment example, the user Z can select a file stored in the USB memory 25 connected to the PC 2, only by selecting proper icons displayed on the liquid crystal display one after another. This procedure of the embodiment example leaves out the trouble of inputting information such as the network address as in the comparative example. Furthermore, in the embodiment example, the user Z only needs to select proper icons one after another; this operation is similar to the memory printing operation that is performed on the PC 2 as apart of the remote panel function. Accordingly, in the embodiment example, the user Z can easily operate the MFP 1 in the same manner as he/she operates the PC 2.

<Processing of MFP and PC>

The following describes specifics of processing performed by the MFP 1 and PC 2 when memory printing is executed in the image processing system 10 with the user performing a remote login from the PC 2.

(1) Processing I of PC

FIG. 5 is a flowchart of processing performed by the PC 2. Strictly speaking, this processing is performed by the controller 24.

Referring to FIG. 5, the PC 2 receives a login request from the user. Here, the login request means input of user ID information pieces, such as a user name and password (Step S1). More specifically, the PC 2 causes the display 22 to display a screen via which the user ID information pieces can be input. Based on the user ID information pieces input by the user, the PC 2 judges whether or not the login should be authorized (Step S2).

To be more specific, the PC 2 judges that the login should be permitted when the input user name and password are included in permission information pieces prestored in the PC 2, the permission information pieces showing, in one-to-one association, user ID information pieces of users who are permitted to log in to the PC 2 (e.g., user names and passwords). The PC 2 judges that the login should not be permitted when the input user name and password are not included in the permission information pieces.

When judging that the login should not be authorized (the "NO" branch of Step S2), the PC 2 terminates the processing of FIG. 5. When judging that the login should be authorized (the "YES" branch of Step S2), the PC 2 stores the input user ID information pieces (Step S3).

Once the user has connected the USB memory 25 to the PC 2 (Step S4) and instructs the PC 2 to initiate the remote panel function, the PC 2 initiates the remote panel function (Step S5). At this time, the PC 2 first causes the display 22 to display a remote request screen. Once the PC 2 has received a user's instruction to perform a remote login via the remote request screen, the PC 2 issues an authorization request, whereby the PC 2 requests the MFP 1 to authorize the user's remote login to the MFP 1 from the PC 2 (Step S6). When issuing the authorization request, the PC 2 also transmits ID information of the PC 2, the user ID information pieces stored in Step S3, and the like to the MFP 1.

Note, in a case where the PC 2 has been configured such that the user need not log in to the PC 2, the processing of Steps S1 through S3 is not performed. In this case, the PC 2 simply receives the input of the user ID information pieces via the remote request screen, and stores the same.

Upon receiving an authorization result from the MFP 1, the PC 2 judges whether the remote login has been authorized, based on the authorization result (Step S7). If the remote login is not authorized (the "NO" branch of Step S7), the PC 2 terminates the processing of FIG. 5. If the remote login is authorized (the "YES" branch of Step S7), the PC 2 judges that the remote login has been successfully performed (Step S8), and causes the display 22 to display a menu screen having the same design as the operation panel 15 of the MFP 1 (Step S9). In causing the display of this menu screen (not illustrated), the PC 2 acquires data required to display a remote operation screen from the MFP 1. In addition to the menu screen, the display 22 can also display various other screens according to user's instructions. These screens basically have the same designs as their corresponding equivalents (screens) displayed on the operation panel 15 of the MFP 1, respectively.

After the PC 2 has received input from the user via each screen, the PC 2 transmits the input information to the MFP 1. When the MFP 1 instructs the PC 2 to display a different screen, the PC 2 causes the display 22 to display this screen. It can be said that the PC 2 performs a remote operation as an alternative to an operation that is supposed to be performed by the operation panel 15 of the MFP 1. During the remote operation, the MFP 1 causes the PC 2 to display screens that are supposed to be displayed on the operation panel 15, and receives input from the user via the screens displayed on the display 22 of the PC 2. This enables the user to perform an input operation while sitting in front of the PC 2, as if he/she is standing in front of the MFP 1.

Once the user has instructed the PC 2 to switch from the menu screen to a job selection screen, the PC 2 causes the display 22 to display the job selection screen, and receives a job selection from the user via the job selection screen (Step S10). This job selection screen is the equivalent of the aforementioned job selection screen 111 to be displayed on the operation panel 15 of the MFP 1 (FIG. 4A).

In causing the display of the job selection screen, the PC 2 notifies the MFP 1 that the PC 2 has been instructed to display the job selection screen, and acquires data required to display the job selection screen from the MFP 1. As other screens (described later) are displayed in the same manner as the job selection screen, the method of displaying the other screens is omitted from the following description. The present description continues while assuming that memory printing is selected.

Once the memory printing has been selected, the PC 2 causes the display 22 to display a file storage selection screen, and receives a selection of file storage from the user via the file storage selection screen, the file storage being storage from which a file to be printed should be acquired (Step S11). This file storage selection screen is the equivalent of the aforementioned file storage selection screen 112. The present description continues while assuming that USB memory has been selected as the file storage.

Once the USB memory has been selected, the PC 2 causes the display 22 to display a USB memory selection screen, and receives, from the user via the USB memory selection screen, a selection of USB memory from which the file to be printed should be acquired (Step S12). This USB memory selection screen is the equivalent of the aforementioned USB memory selection screen 113. Note, during display of this USB memory selection screen, the PC 2 causes the display 22 to display information of the USB memory 25 attached to the own device (PC 2) in the following manner. The PC 2 causes the display 22 to additionally display a window showing the information of the USB memory 25, in such a manner that the window overlaps over the USB memory selection screen 113 acquired from the MFP 1. This way, the user can select the window, and the PC 2 can receive the user's selection. To the user, it looks as if the USB memory selection screen on the display 22 displays both (i) a button for the USB memory connected to the MFP 1 (equivalent to the USB memory A button illustrated in FIG. 4A) and (ii) a button for the USB memory 25 connected to the PC 2 (equivalent to the PC/USB memory button 123 illustrated in FIG. 4A). In other words, the USB memory selection screen on the display 22 has substantially the same design as the USB memory selection screen 113. The present description continues while assuming that the button for the USB memory 25 is selected.

Once the button for the USB memory 25 has been selected, the PC 2 causes the display 22 to display a file selection screen, and receives, from the user via the file selection screen, a selection of the file to be printed (Step S13). This file selection screen is the equivalent of the aforementioned file selection screen 114. The PC 2 reads out ID information pieces of files stored in the USB memory 25, and causes the display 22 to display the read ID information pieces (e.g., file names).

Once the user has selected the file to be printed, the PC 2 causes the display 22 to display a memory printing execution screen. The PC 2 receives execution conditions and an execution instruction from the user via the memory printing execution screen. Examples of the execution conditions include a sheet size and the number of print sets. Upon receiving the execution instruction, the PC 2 transmits the received information (the execution conditions and execution instruction) to the MFP 1 (Step S14), and terminates the processing of FIG. 5. The MFP 1 executes the job based on the information transmitted from the PC 2 (the selected job, file name, execution conditions, etc.).

The above has described an exemplary case where the user completes all the input operations required to execute memory printing from the PC 2 using the remote panel function. As opposed to this, there is also a case where the user has to go to the MFP 1 in the middle of the input operations, i.e., a case where the movement (4) of FIG. 3 occurs. Specifics of processing performed in the latter case are described later.

(2) Processing I of MFP

Figure 6:
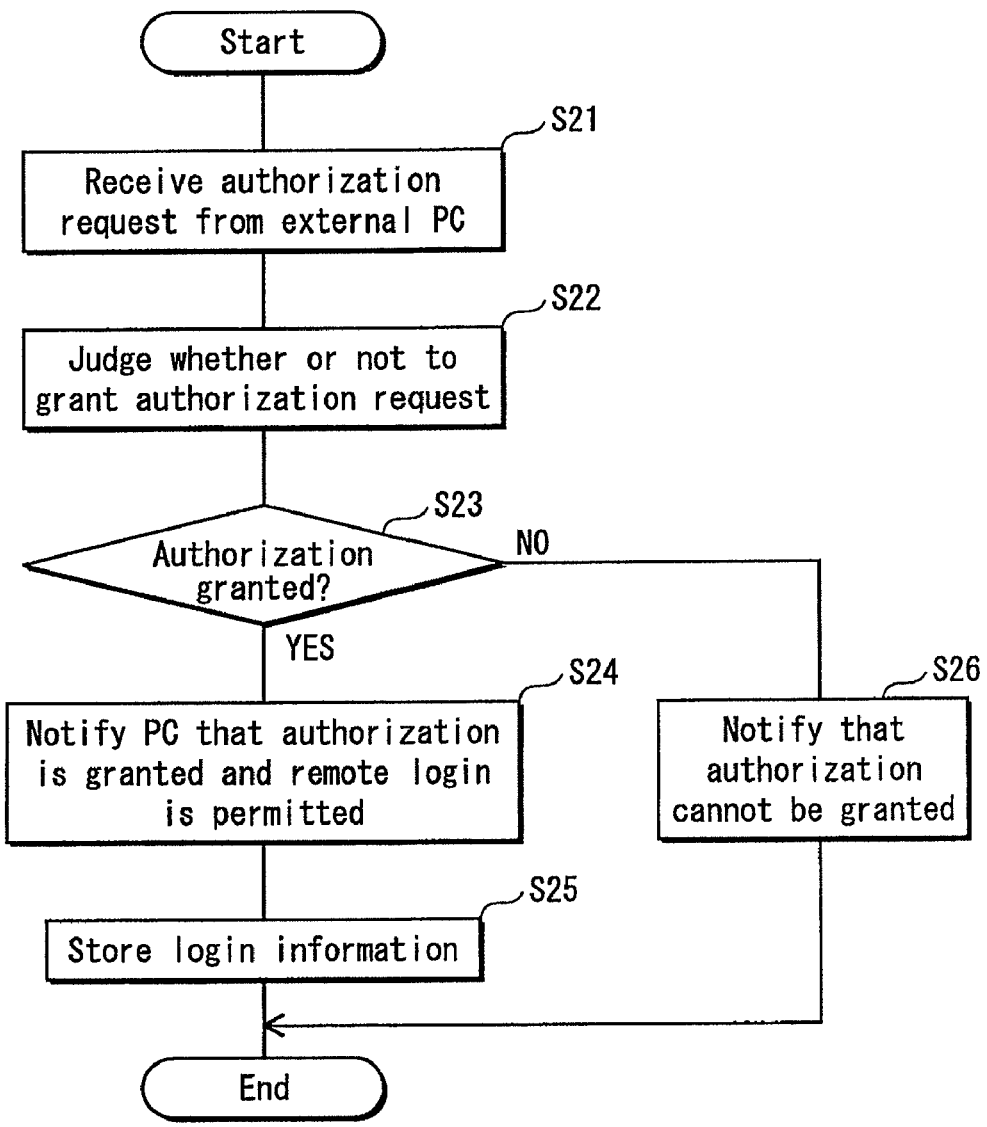
FIG. 6 is a flowchart of processing performed by the MFP when the MFP has received an authorization request from the PC.

FIG. 6 is a flowchart of processing performed by the MFP 1 when the MFP 1 has received the authorization request from the PC 2. Strictly speaking, this processing is performed by the controller 16.

As shown in FIG. 6, once the MFP 1 has received the authorization request from an external terminal (the PC 2) (Step S21), the MFP 1 judges whether it should grant the authorization (Step S22). This judgment is made based on whether the user ID information pieces (here, user ID and password) included in the received authorization request is included in the above-described permission information pieces.

When judging that the authorization cannot be granted (the "NO" branch of Step S23), the MFP 1 notifies the PC 2 that the authorization cannot be granted (Step S26), and terminates the processing of FIG. 6.

When judging that the authorization can be granted (the "YES" branch of Step S23), the MFP 1 notifies the PC 2 that the authorization request is granted and thus the remote login is permitted (Step S24). The MFP 1 also stores a login information piece into the login information table in the storage unit 106 (Step S25), the login information piece showing that the PC 2 has logged in to the MFP 1. Thereafter, the MFP 1 terminates the processing of FIG. 6.

FIG. 7 shows exemplary contents of a login information table 151.

As shown in FIG. 7, the login information table 151 contains login information pieces, each of which shows (i) a user name (ID) of a user who has requested a login, (ii) a password of the user, (iii) ID information of a request source (a device from which the login has been requested), (iv) a network address of the request source, and (v) a login time at which the login is permitted. The user name and password are acquired from a user ID information piece contained in a remote login request from the PC 2. The ID information and network address of a request source (an external terminal that has requested a login) are acquired by the MFP 1 communicating with the PC 2 while the PC 2 is remotely logged in to the MFP 1. The login time is acquired from an internal timer (not illustrated).

As described above, the term "login" encompasses both (i) a login via the operation panel 15 and (ii) a remote login from an external terminal. Each time the controller 16 permits any of these logins, the controller 16 writes a login information piece for the permitted login to the login information table 151. Each time a logout is performed, the controller 16 deletes the login information piece for the logout from the login information table 151. The login information table 151 shown in FIG. 7 pertains to an exemplary case where a single user having one user name has logged in to the MFP 1 via the operation panel 15, after he/she had remotely logged in to the MFP 1 from a PC (an external device); in other words, the user's remote login from the external device, as well as the user's (operator's) login via the operation panel 15 of the MFP 1, is continued.

(3) Processing II of MFP

Figure 8:
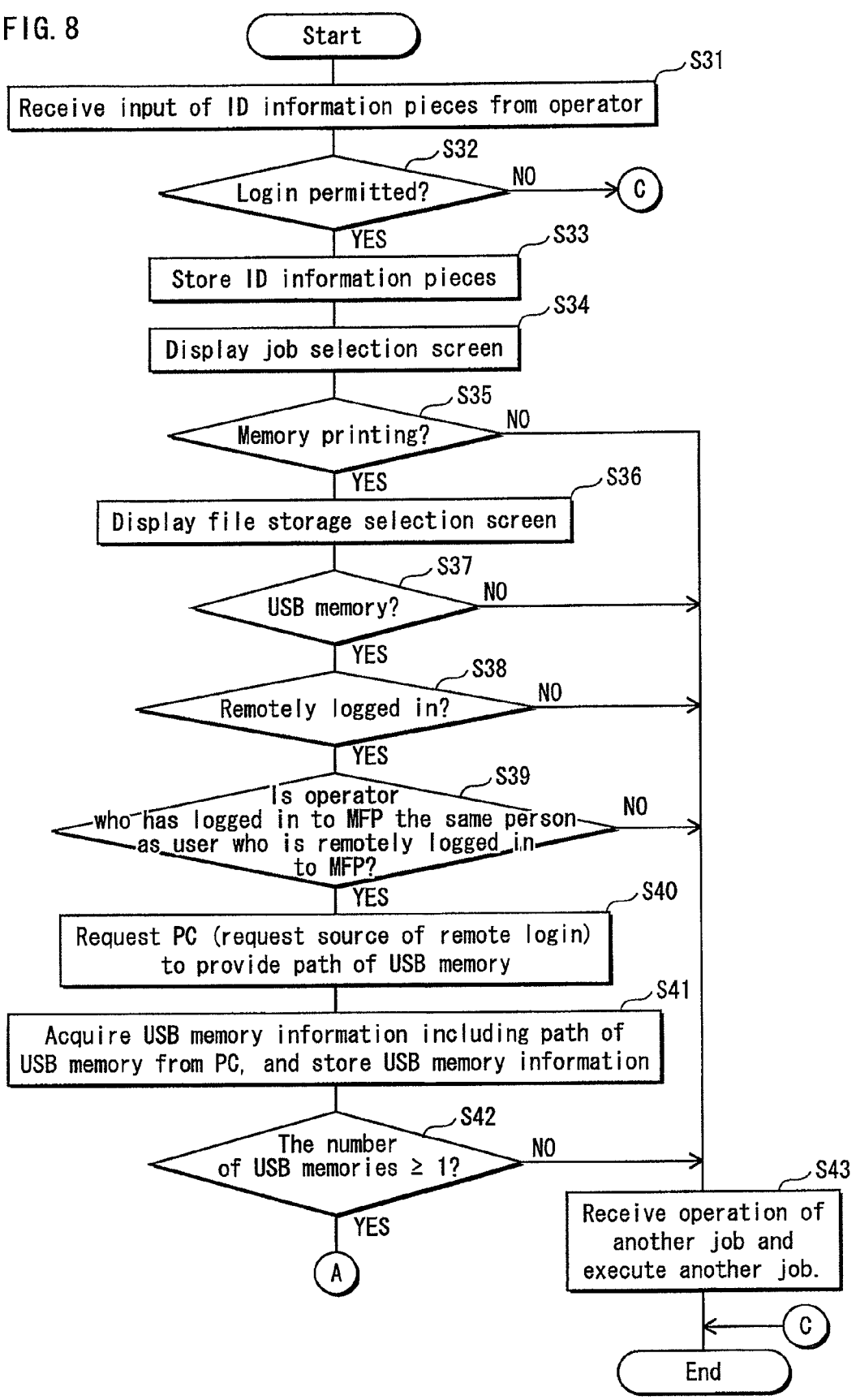
FIG. 8 is a flowchart of a part of processing performed by the MFP when the MFP has received a login request from an operator via the operation panel.
Figure 9:
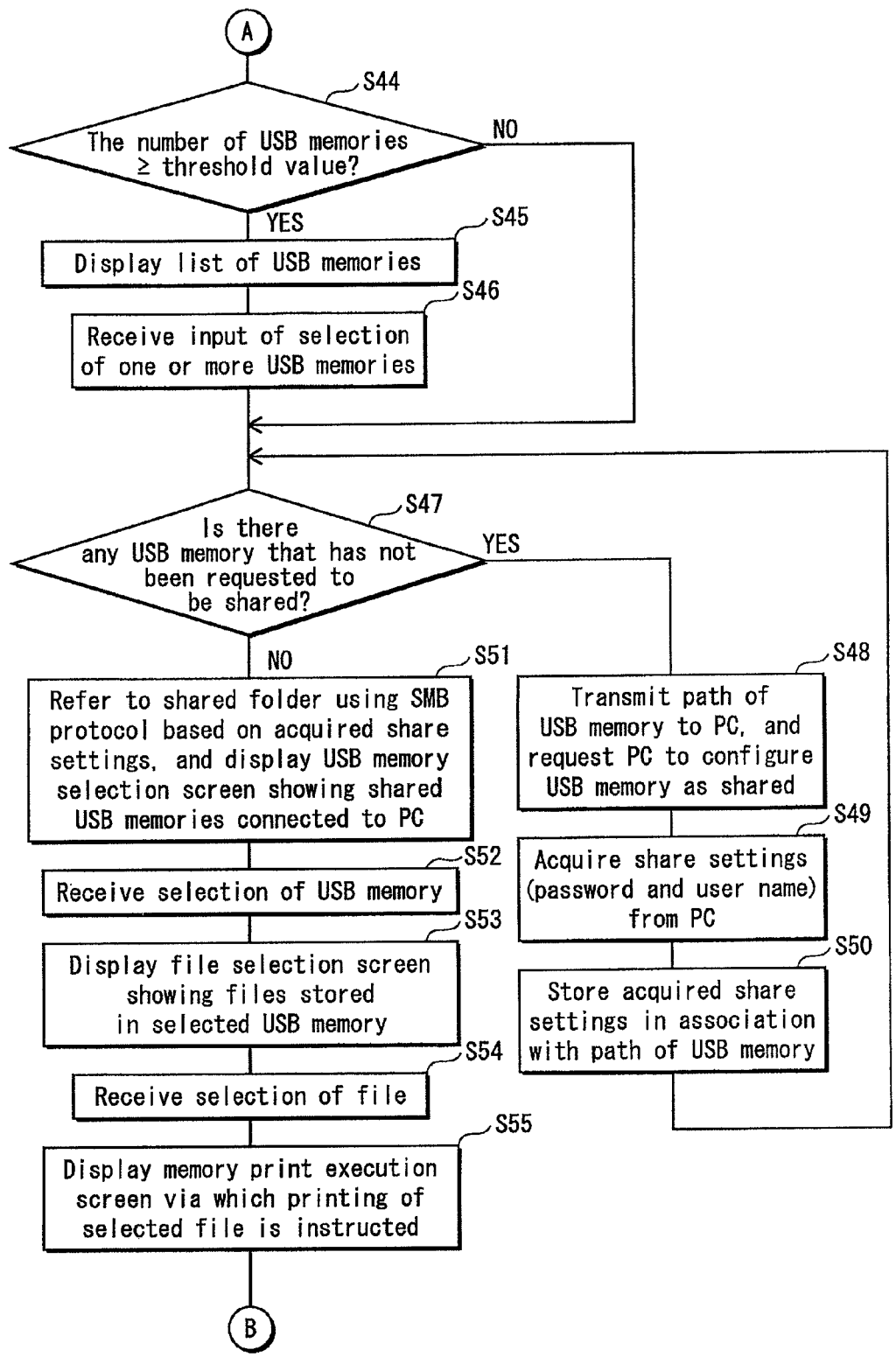
FIG. 9 is a flowchart of another part of the processing performed by the MFP when the MFP has received the login request from the operator via the operation panel.
Figure 10:
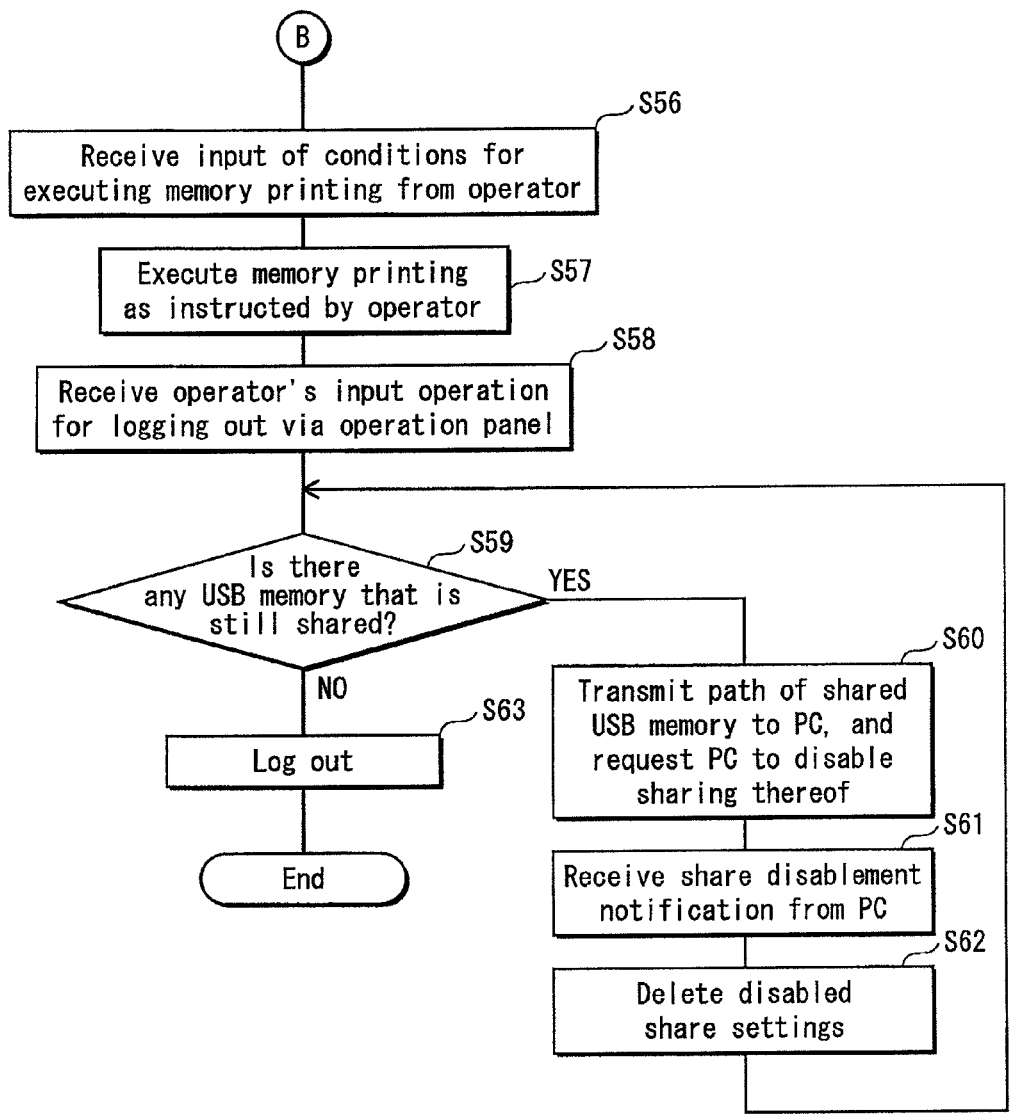
FIG. 10 is a flowchart of the rest of the processing performed by the MFP when the MFP has received the login request from the operator via the operation panel.

FIGS. 8 to 10 are flowcharts of processing performed by the MFP 1 when the MFP 1 has received a login request from an operator via the operation panel 15.

Referring to FIG. 8, the MFP 1 receives a login request from the operator via the operation panel 15 (Step S31). Here, the login request means input of ID information pieces such as a user ID and a password. At this time, the operation panel 15 displays an input reception screen, via which the MFP 1 receives input of the ID information pieces from the operator.

Based on the ID information pieces input by the operator, the MFP 1 judges whether the login should be permitted (Step S32). To be more specific, the MFP 1 judges that the login should be permitted when the input ID information pieces (user ID and password) are included in the permission information pieces managed/prestored in the user management unit 103. The MFP 1 judges that the login should not be permitted when the input ID information pieces are not included in the permission information pieces.

When judging that the login should not be permitted (the "NO" branch of Step S32), the MFP 1 terminates the processing of FIG. 8. When judging that the login should be permitted (the "YES" branch of Step S32), the MFP 1 stores the input ID information pieces (Step S33).

The MFP 1 causes the liquid crystal display of the operation panel 15 to display the job selection screen 111 (FIG. 4A) (Step S34). If the operator touches a button other than the memory print button 121 (a scan button, a copy button, etc.) on the job selection screen 111, the MFP 1 judges that memory printing has not been selected (the "NO" branch of Step S35), and proceeds to Step S43. In Step S43, if the MFP 1 receives an operation for the selected job and an instruction to execute the selected job, the MFP 1 executes the selected job according to the instruction, and terminates the processing of FIG. 8.

On the other hand, if the operator touches the memory print button 121 (the "YES" branch of Step S35), the MFP 1 judges that the operator has instructed the MFP 1 to execute memory printing, and causes the liquid crystal display of the operation panel 15 to display the file storage selection screen 112 (FIG. 4A) (Step S36).

The MFP 1 judges whether the operator has touched the USB memory button 122 on the file storage selection screen 112 (Step S37). When judging that the operator has touched a button other than the USB memory button 122 (the "NO" branch of Step S37), the MFP 1 proceeds to Step S43. In Step S43, the MFP 1 performs processing of, for example, acquiring a file from the selected storage.

When judging that the operator has touched the USB memory button 122 (the "YES" branch of Step S37), the MFP 1 further judges whether this operator is currently remotely logged in to the MFP 1 (Step S38). The MFP 1 makes this judgment by referring to the "Request source" fields of the login information pieces written in the aforementioned login information table 151. To be more specific, if the "Request source" fields contain information indicating the external terminal, the MFP 1 judges that the external device is still remotely logged in to the MFP 1. If the "Request source" fields contain no information indicating the external terminal (i.e., if the "Request source" fields only contain information indicating the MFP 1), the MFP 1 judges that the external device is not remotely logged in to the MFP 1.

When judging that the external device is not remotely logged in to the MFP 1 (the "NO" branch of Step S38), the MFP 1 proceeds to Step S43. In Step S43, the MFP 1 only receives, via the USB memory selection screen 113, a selection of USB memory connected to the own apparatus (MFP 1), and executes memory printing according to the selected USB memory. Here, the operator can only select the USB memory connected to the MFP 1 for the following reason. When the MFP 1 has proceeded to Step S43, processing of Steps S47 through S63 (described later) is not performed. Accordingly, the MFP 1 cannot acquire information of the USB memory 25 connected to the PC 2. As a result, the liquid crystal display of the operation panel 15 cannot display an icon of the USB memory 25 connected to the PC 2, and can only display an icon of the USB memory connected to the own apparatus (MFP 1).

On the other hand, when judging that the external device is remotely logged in to the MFP 1 (the "YES" branch of Step S38), the MFP 1 further judges whether the operator who has logged in to the MFP 1 via the operation panel 15 of the own apparatus (MFP 1) is the same person as the user who is remotely logged in to the MFP 1 from the external device (the user who has requested the remote login) (Step S39). Here, the MFP 1 makes this judgment by referring to the login information pieces written in the login information table 151. To be more specific, the MFP 1 judges in the affirmative when the user ID and password shown by a login information piece whose "Request source" field indicates the own apparatus (MFP 1) match the user ID and password shown by a login information piece whose "Request source" field indicates the PC 2 (external device). The MFP 1 judges in the negative when the former user ID and password do not match the latter user ID and password. In the example of FIG. 7, the MFP 1 judges in the affirmative when the password shown by the login information piece labeled "No. 1" matches the password shown by the login information piece labeled "No. 2".

When judging that the operator who has logged in to the MFP 1 from the MFP 1 is not the same person as the user who is remotely logged in to the MFP 1 (the "NO" branch of Step S39), the MFP 1 proceeds to Step S43. In this case, since the operator who has requested the login to the MFP 1 from the MFP 1 is different from the user who is remotely logged in to the MFP 1, the MFP 1 performs the same processing as in the case where the external device is not remotely logged in to the MFP 1 (the "NO" branch of Step S38).

On the other hand, when judging that the operator who has logged in to the MFP 1 from the MFP 1 is the same person as the user who is remotely logged in to the MFP 1 (the "YES" branch of Step S39), the MFP 1 proceeds to Step S40. Described below is an exemplary case where the user Z is both (i) the user who has requested the remote login to the MFP 1 and (ii) the operator who has logged in to the MFP 1 via the operation panel 15. Hereinafter, the term "operator" denotes the user Z.

In Step S40, the MFP 1 requests the external terminal device, which is the request source of the remote login (i.e., the PC 2), to provide the MFP 1 with a path of each USB memory connected to the PC 2. Specifics of processing performed by the PC 2 upon receiving this request are described later. To sum up this processing, the PC 2 transmits one or more USB memory information pieces to the request source (here, the MFP 1), each of the one or more USB memory information pieces showing a path, name, etc. of a corresponding one of USB memories connected to the own device (PC 2). When no USB memory is connected to the PC 2, the one or more USB memory information pieces show that the PC 2 is in an unconnected state.

Once the MFP 1 receives the one or more USB memory information pieces from the PC 2, the MFP 1 stores the received one or more USB memory information pieces (Step S41). With reference to the one or more USB memory information pieces thus stored, the MFP 1 judges whether the number of USB memories connected to the PC 2 is (i) one or more, or (ii) smaller than one (Step S42). When judging that the number of USB memories connected to the PC 2 is smaller than one, namely zero (i.e., the PC 2 is in the unconnected state) (the "NO" branch of Step S42), the MFP 1 proceeds to Step S43. In this case, no file can be acquired from the PC 2. Accordingly, in Step S43, the MFP 1 performs processing of, for example, receiving an instruction to execute a job other than memory printing.

When judging that the number of USB memories connected to the PC 2 is one or more (the "YES" branch of Step S42), the MFP 1 proceeds to processing shown in FIG. 9, and further judges whether or not the number is equal to or greater than a threshold value (Step S44). The MFP 1 makes this judgment in Step S44 for the following reason. As will be described later, the MFP 1 requests the PC 2 to configure one or more USB memories connected to the PC 2 as shared, causes the operation panel 15 to display the shared USB memories, and receives a selection of one of the shared USB memories from the operator. If too many USE memories are connected to the PC 2, then the MFP 1 has to require a large amount of time and bear heavy workload to (i) request the PC 2 to configure all of these USE memories as shared, and (ii) cause the operation panel 15 to display all of these USE memories. To avoid the above problem, when the number of USB memories connected to the PC 2 is equal to or greater than the threshold value, the MFP 1 makes the operator select only necessary USB memory (or memories) from among all of the USB memories connected to the PC 2, so as to limit the number of USB memories that the MFP 1 requests the PC 2 to configure as shared. The threshold value may have been predetermined, or may be set by an administrator or the like as necessary.

When judging that the number of USB memories connected to the PC 2 is smaller than the threshold value (the "NO" branch of Step S44), the MFP 1 proceeds to Step S47. On the other hand, when judging that the number of USB memories connected to the PC 2 is equal to or greater than the threshold value (the "YES" branch of Step S44), the MFP 1 causes the operation panel 15 to display a USB memory list screen 115 (FIG. 11) showing the list of USB memories connected to the PC 2 (Step S45), and receives a selection of USB memory (or memories) from the operator via the USB memory list screen 115 (Step S46).

The USB memory list screen 115 shows buttons 131, 132, . . . that respectively represent the USB memories connected to the PC 2. The buttons 131, 132, . . . are generated based on information of paths of the USB memories, which are included in the USB memory information pieces stored in the above-described manner. The operator can select, from among the list of USB memories, one or more desired USB memories by touching the corresponding buttons.

Continuing with FIG. 9, in Step S47, the MFP 1 judges whether or not the USB memories 25 connected to the PC 2 (if the selection of Step S46 has been performed, the selected USB memories) include one or more USB memories that the MFP 1 has not requested the PC 2 to configure as shared. When performing the processing of Step S47 for the first time, the MFP 1 has not requested the PC 2 to configure any of the USB memories connected thereto as shared, and therefore judges that the USB memories 25 connected to the PC 2 include one or more USB memories that the MFP 1 has not requested the PC 2 to configure as shared. Once this judgment is made (the "YES" branch of Step S47), the MFP 1 (i) refers to the USB memory information pieces that have been stored in the above-described manner, (ii) transmits a path of one of the one or more USB memories to the PC 2, and (iii) requests the PC 2 to configure this USB memory as shared, in this case by using SMB protocol (Step S48).

Specifics of processing performed by the PC 2 upon receiving this request are described later. To sum up this processing, upon receiving this request, the PC 2 sets a temporal password as a condition for sharing the requested USB memory, and provides the MFP 1 with the password and the user name of the user who is remotely logged in to the MFP 1 (the user name that the user—here, the user Z—has used when logging in to the PC 2) as share settings.

In Step S49, the MFP 1 receives the share settings (password and user name) transmitted from the PC 2. In Step S50, the MFP 1 stores the received share settings in association with the path of the corresponding USE memory (here, the MFP 1 writes the received share settings into a share settings table stored in the storage unit 106.

Figures 11, 12:
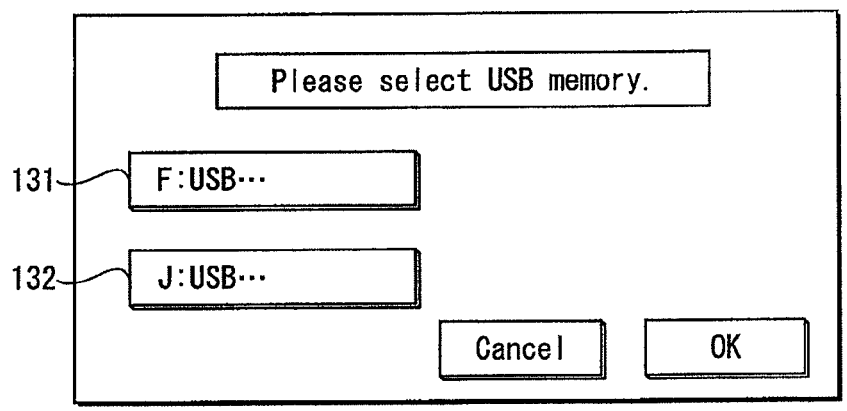
FIG. 11 shows an example of a list screen displayed on the operation panel of the MFP.
FIG. 12 shows exemplary contents of a share settings table stored in the MFP.

FIG. 12 shows exemplary contents of a share settings table 152.

As shown in FIG. 12, in the share settings table 152 are written share settings information pieces, each of which shows, in one-to-one association, (i) ID information of an external terminal (the PC 2), (ii) a path of USB memory connected to the terminal, (iii) a shared password (temporal password), and (iv) a user name. When a plurality of USB memories are connected to the PC 2, a share settings information piece is written for each of the plurality of USB memories, in each row of the share settings table 152. Accordingly, with reference to the share settings table 152, the MFP 1 can acquire information (path, password, etc.) relating to each USB memory that is configured as shared by the PC 2. Note, as will be described later, once sharing of USB memory is disabled, the share settings information piece associated with this USB memory is deleted from the share settings table 152.

Continuing with FIG. 9, once the MFP 1 has stored the share settings and the like for the corresponding USB memory in Step S50, the MFP 1 returns to Step S47, and judges whether the USB memories 25 still include one or more USB memories that the MFP 1 has not requested the PC 2 to configure as shared. When judging in the affirmative (the "YES" branch of Step S47), the MFP 1 repeatedly performs the processing of Steps S48 through S50 for all of the USB memories (if the selection of Step S46 has been performed, for all of the selected USB memories), requesting the PC 2 to configure them as shared. As one example, when only one USB memory is connected to the PC 2, the MFP 1 proceeds to Step S51 after performing the processing of Steps S47 through S50 only once.

When judging that the MFP 1 has requested the PC 2 to configure all the USB memories as shared (the "NO" branch of Step S47), the MFP 1 proceeds to Step S51. In Step S51, the MFP 1 causes the operation panel 15 to display the USB memory selection screen 113 (FIG. 4A) via which the MFP 1 receives a selection of file storage from the operator. The USB memory selection screen 113 displays USB memory connected to the own apparatus (MFP 1), as well as USB memories that have been configured as shared by the PC 2.

The USB memories that have been configured as shared by the PC 2 are displayed based on the share settings information pieces written in the share settings table 152. Here, the MFP judges that the number of USE memories that have been configured as shared by the PC 2 is equal to the number of paths of PC 2 written in the path fields of the share settings information pieces. The MFP 1 accordingly causes the operation panel 15 to display, for each path, an icon showing (i) the name of a drive indicated by the path and (ii) the name of the corresponding USE memory. FIG. 4A shows an exemplary case where the USB memory selection screen 113 displays (i) an icon of one USB memory connected to the MFP 1 (the USB memory A button), and (ii) an icon of one USB memory connected to the PC 2 (the PC/USB memory button 123).

In Step S52 of FIG. 9, the MFP 1 receives a selection of USB memory from the operator via the USB memory selection screen 113. For example, if the operator touches the PC/USB memory button 123—i.e., if the operator selects the USB memory 25 connected to the PC 2, the MFP 1 causes the operation panel 15 to display the file selection screen 114 (FIG. 4A) showing files stored in the selected USB memory 25 (Step S53). Here, the MFP 1 causes the display of these files by referring to a shared folder of the PC 2 by using SMB protocol, based on the share settings information pieces (user name, path, password, etc.) written in the share settings table 152.

Here, the MFP 1 reads out a path, password and user name associated with the selected USB memory 25, and provides the PC 2 with the read path, password and user name. The PC 2 permits the MFP 1 to access the path only when the following conditions are both satisfied: (i) the PC 2 judges that the user name provided from the MFP 1 belongs to one of users who are permitted to log in to the PC 2; and (ii) the password associated with the path provided from the MFP 1 matches the temporal password that had been previously set. Once the PC 2 has permitted the MFP 1 to access the path, the MFP 1 accesses a folder stored in the USB memory 25 indicated by the path, and refers to a group of files stored in the folder.

The MFP 1 receives a selection of one of the group of files from the operator via the file selection screen 114 (Step S54). Once the operator has selected the file—e.g., once the operator has touched the button 124 showing the file name of the file, the MFP 1 causes the operation panel 15 to display a memory print execution screen via which the operator instructs the MFP 1 to print the selected file (Step S55). Via this memory print execution screen (not illustrated), the MFP 1 receives the operator's inputs relating to conditions for executing the print job, e.g., the number of print sets, darkness, and various other functions such as double sided printing and 2-in-1 printing.

Referring to FIG. 10, after the MFP 1 has received conditions for executing memory printing from the operator (Step S56), the MFP 1 executes the memory printing (Step S57). More specifically, the MFP 1 receives the file selected in Step S54 from the PC 2 via the LAN 3, and executes a print job of printing the received file in accordance with the conditions received in Step S56. In this respect, it can be said that the controller 16, when performing the processing of Steps S40 through S57, functions as file operating means for getting permission from the PC 2 to access a file of the PC 2 and acquiring the file from the PC 2, based on an instruction to execute an image processing job, which is issued via the operation panel 15 by the operator who is remotely logged in to the MFP 1.

After the print job is executed, when the MFP 1 has received the operator's input operation for logging out via the operation panel 15 (Step S58), the MFP 1 judges whether one or more of the USB memories connected to the PC 2 are still configured as shared (Step S59). The MFP 1 makes this judgment by referring to the share settings table 152. To be more specific, the MFP 1 judges in the affirmative when one or more share settings information pieces associated with the PC 2 are still written in the share settings table 152. The MFP 1 judges in the negative when no share settings information pieces associated with the PC 2 is written in the share settings table 152 (i.e., when all of the share settings information pieces associated with the PC 2 have been deleted from the share settings table 152).

When judging that one or more of the USB memories connected to the PC 2 are still configured as shared (the "YES" branch of Step S59), the MFP 1 (i) refers to the share settings table 152, (ii) transmits paths of all the shared USB memories and, as well as passwords and user names associated with these paths, to the PC 2, and (iii) requests the PC 2 to disable sharing of all the USB memories (Step S60). As will be described later, once the PC 2 has received a share disablement request from the MFP 1, the PC 2 disables sharing of USB memories as requested, and transmits, to the MFP 1, a disablement notification indicating that sharing of USB memories has been disabled.

Upon receiving the disablement notification from the PC 2, the MFP 1 deletes, from the share settings table 152, the disabled share settings—i.e., share settings information pieces associated with the USB memories sharing of which has been disabled according to the share disablement request (Step S62). Thereafter, the MFP 1 returns to Step S59.

In Step S59, the MFP 1 again judges whether one or more of the USB memories connected to the PC 2 are still configured as shared. When no share settings information pieces associated with the PC 2 is written in the share settings table 152—i.e., when all the share settings information pieces associated with the PC 2 have been deleted from the share settings table 152, the MFP 1 judges that none of the USE memories connected to the PC 2 is configured as shared (the "NO" branch of Step S59), logs out (Step S63), and terminates the processing of FIG. 10.

(4) Processing II of PC

Figure 13:
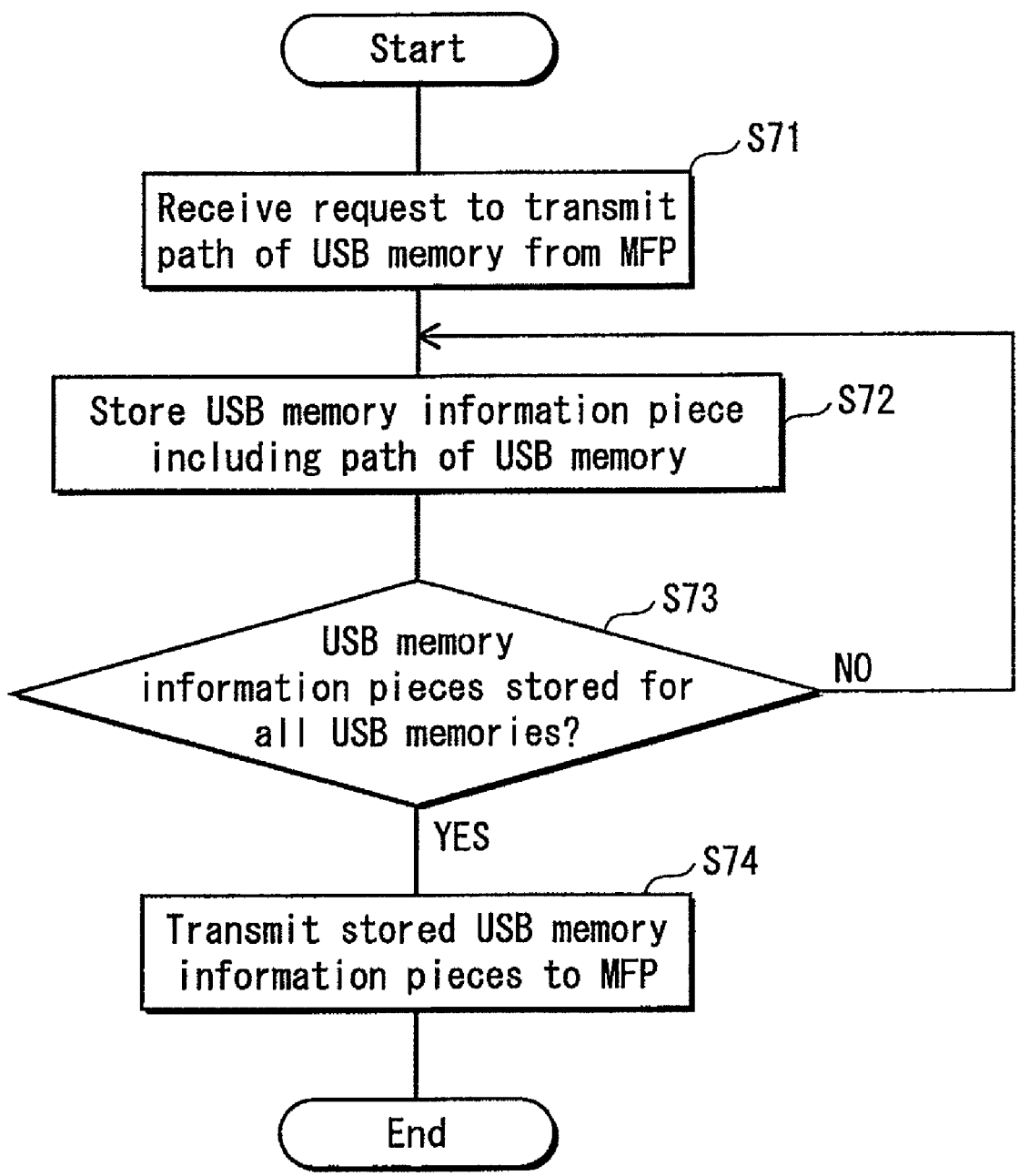
FIG. 13 is a flowchart of processing performed by the PC when the PC receives, from the MFP, a path transmission request for transmitting a path of USB memory while the PC is remotely logged in to the MFP.

FIG. 13 is a flowchart of processing performed by the PC 2 when the PC 2 receives, from the MFP 1, a path transmission request for transmitting a path of USB memory (Step S40) while the PC 2 is remotely logged in to the MFP 1.

As shown in FIG. 13, once the PC 2 receives the path transmission request from the MFP 1 (Step S71), the PC 2 (i) detects, from among all the drives of the own device (PC 2), one or more drives to which USB memories are connected, (ii) reads out a path of the USB memory connected to each of the detected drives (e.g., a drive name), as well as the name and the like of each USB memory, and (iii) stores the read information pieces as USB memory information pieces (Step S72). Then, the PC 2 judges whether USB memory information pieces for all the USB memories have been stored (Step S73). When a plurality of USB memories are connected to the PC 2, the PC 2 judges that the USB memory information pieces for all the USB memories have not been stored yet (the "NO" branch of Step S73), and returns to Step S72, in which the PC 2 stores a USB memory information piece for another USB memory.

The PC 2 repeatedly performs the processing of Steps S72 and S73, until the PC 2 stores USB memory information pieces for all of the USB memories. When judging that USE memory information pieces for all the USB memories have been stored (the "YES" branch of Step S73), the PC 2 transmits the stored USB memory information pieces to the request source (here, the MFP 1) (Step S74), and terminates the processing of FIG. 13. Note, when no USB memory is connected to the PC 2, each USB memory information piece shows that the PC 2 is in an unconnected state.

(5) Processing III of PC

Figure 14:
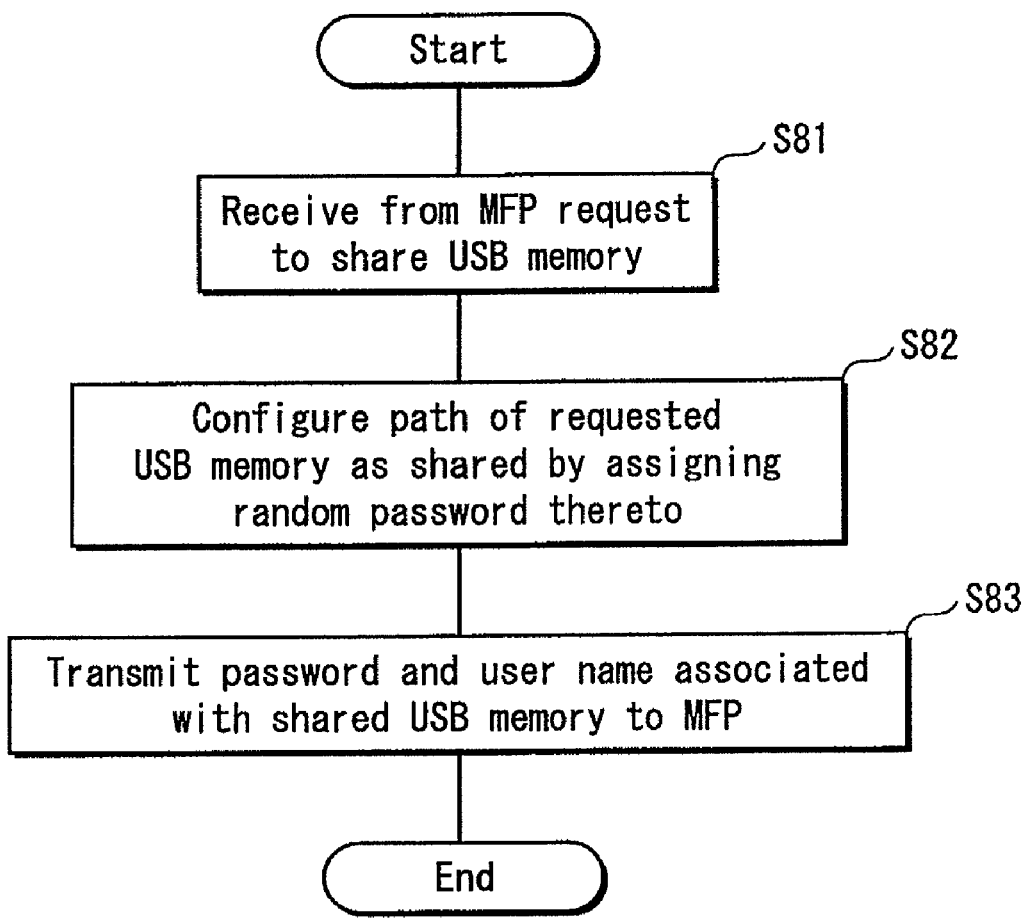
FIG. 14 is a flowchart of processing performed by the PC when the PC receives, from the MFP, a share settings request for configuring USB memory as shared while the PC is remotely logged in to the MFP.

FIG. 14 is a flowchart of processing performed by the PC 2 when the PC 2 receives, from the MFP 1, a share settings request for configuring USB memory as shared (Step S48) while the PC 2 is remotely logged in to the MFP 1.

As shown in FIG. 14, once the PC 2 receives the share settings request from the MFP 1 (Step S81), the PC 2 configures the path of the requested USB memory (transmitted along with the share settings request) as shared, by assigning a password that has been randomly and temporarily generated to this path (Step S82). This password is stored in association with the shared path, and is used in judging whether to permit the MFP 1 to access a folder stored in the requested USB memory, when such an access is attempted by the MFP 1 as described above. When a plurality of paths are transmitted from the MFP 1, the PC 2 configures each of the paths as shared in the above-described manner.

Once all the requested USB memories have been configured as shared, the PC 2 transmits the user name (the user name used by the user Z when logging in to the PC 2) and the password temporarily set for each path to the MFP 1 (Step S83). Thereafter, the PC 2 terminates the processing of FIG. 14.

(6) Processing III of PC

Figure 15:
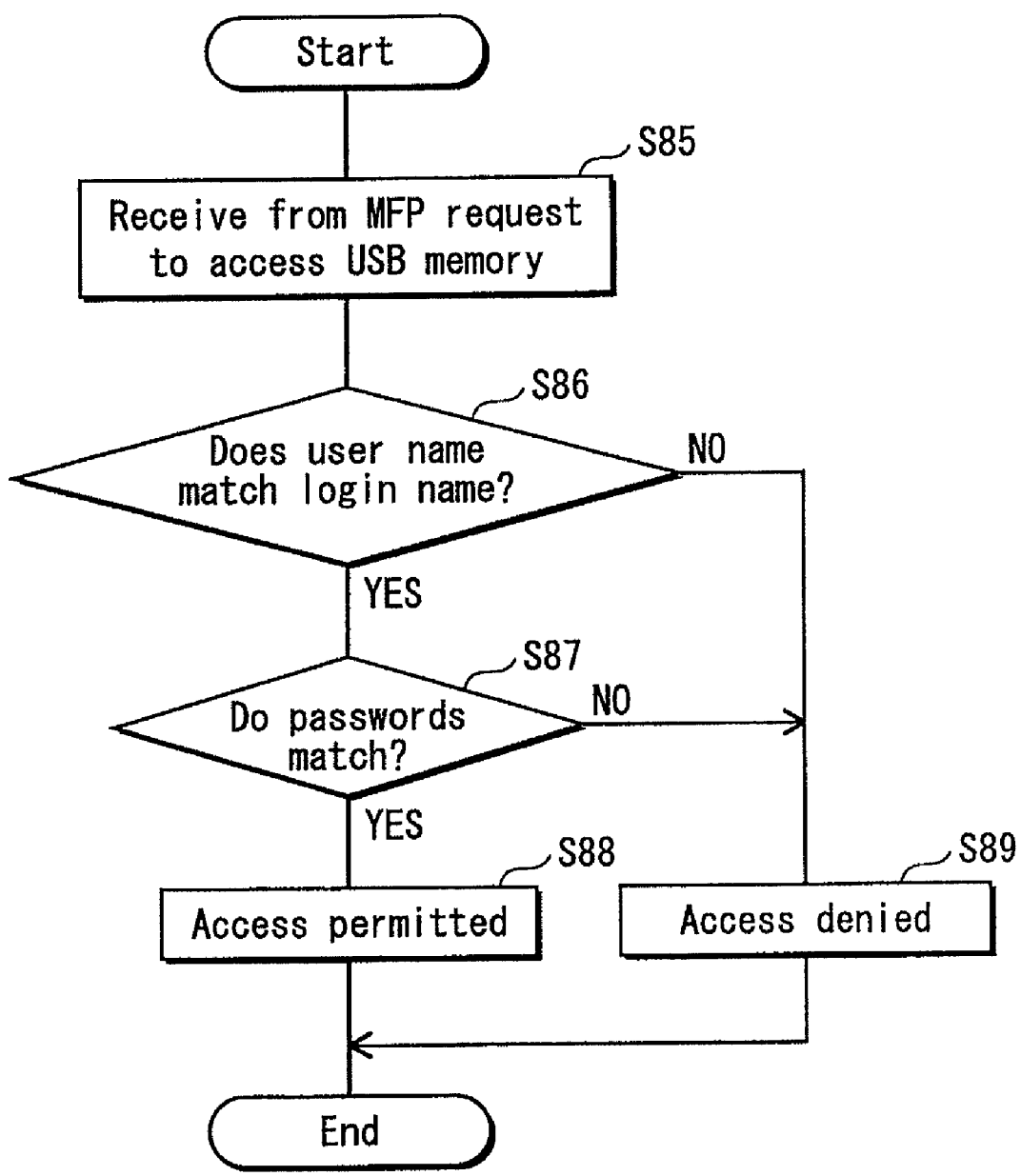
FIG. 15 is a flowchart of processing performed by the PC when the PC receives, from the MFP, an access request for accessing USE memory from the MFP while the PC is remotely logged in to the MFP.

FIG. 15 is a flowchart of processing performed by the PC 2 when the PC 2 receives, from the MFP 1, an access request for accessing USB memory (Step S51) while the PC 2 is remotely logged in to the MFP 1.

As shown in FIG. 15, once the PC 2 has received the access request from the MFP 1 (Step S85), the PC 2 judges whether the user name transmitted along with the access request matches one of user names of users who are permitted to log in to the MFP 1, the user names being managed in the PC 2 (Step S86). Here, the PC 2 makes this judgment for the user name of the user Z.

When judging that the user names match (the "YES" branch of Step S86), the PC 2 further judges whether the password transmitted from the MFP 1 along with the access request matches the password set in Step S82 (Step S87). When judging that the passwords match (the "YES" branch of Step S87), the PC 2 permits the access (Step S88) and terminates the processing of FIG. 15. On the other hand, when judging that the user names do not match (the "NO" branch of Step S86), the access is denied (Step S89) and terminates the processing of FIG. 15. Also, when judging that the passwords do not math (the "NO" branch of Step S87), the PC 2 does not permit the access (Step S89) and terminate the processing of FIG. 15. Note, although it has been described above that matching of the user names and passwords is one of the conditions for permitting the access, the conditions for permitting the access are not limited to this. For instance, in a case where the PC 2 does not acquire the user name from the MFP 1, an access condition may be satisfied when the passwords match. Alternatively, other types of access conditions may be employed.

(7) Processing IV of PC

Figure 16:
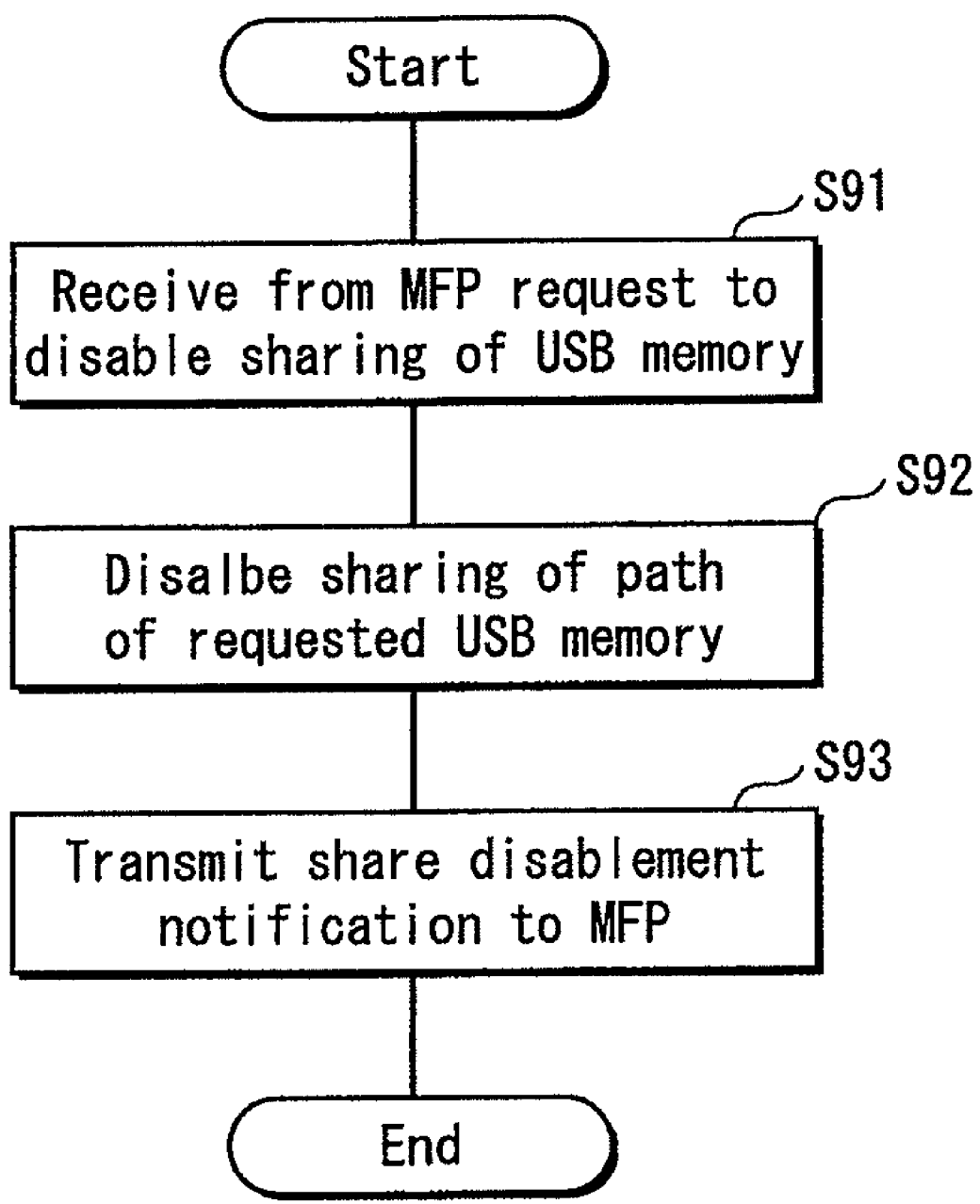
FIG. 16 is a flowchart of processing performed by the PC when the PC receives, from the MFP, a share disablement request for disabling sharing of USB memory while the PC is remotely logged in to the MFP.

FIG. 16 is a flowchart of processing performed by the PC 2 when the PC 2 receives, from the MFP 1, the share disablement request for disabling sharing of USE memory (Step S60) while the PC 2 is remotely logged in to the MFP 1.

As shown in FIG. 16, upon receiving the share disablement request from the MFP 1 (Step S91), the PC 2 disables sharing of the requested USB memory based on the path, password and user name associated with the requested USB memory, which have been transmitted along with the request (Step S92). To be more specific, the PC 2 disables sharing of the USB memory indicated by the path received from the MFP 1 when the following conditions are both satisfied: (i) the PC 2 judges that the user name received from the MFP 1 belongs to one of the users who are permitted to log in to the PC 2; and (ii) the password associated with the received path matches the password set in Step S82. Once the sharing of the requested USE memory has been disabled, the PC 2 erases the password stored in association with the requested USB memory. If the share disablement request is issued for a plurality of USB memories, the above share-disabling processing is performed for all of the USB memories, one after another.

Once the above share-disabling processing is completed, the PC 2 transmits, to the MFP 1, a share disablement notification indicating that sharing of all the USB memories has been disabled (Step S93). Thereafter, the PC 2 terminates the processing of FIG. 16.

(8) Processing V of PC

Figure 17:
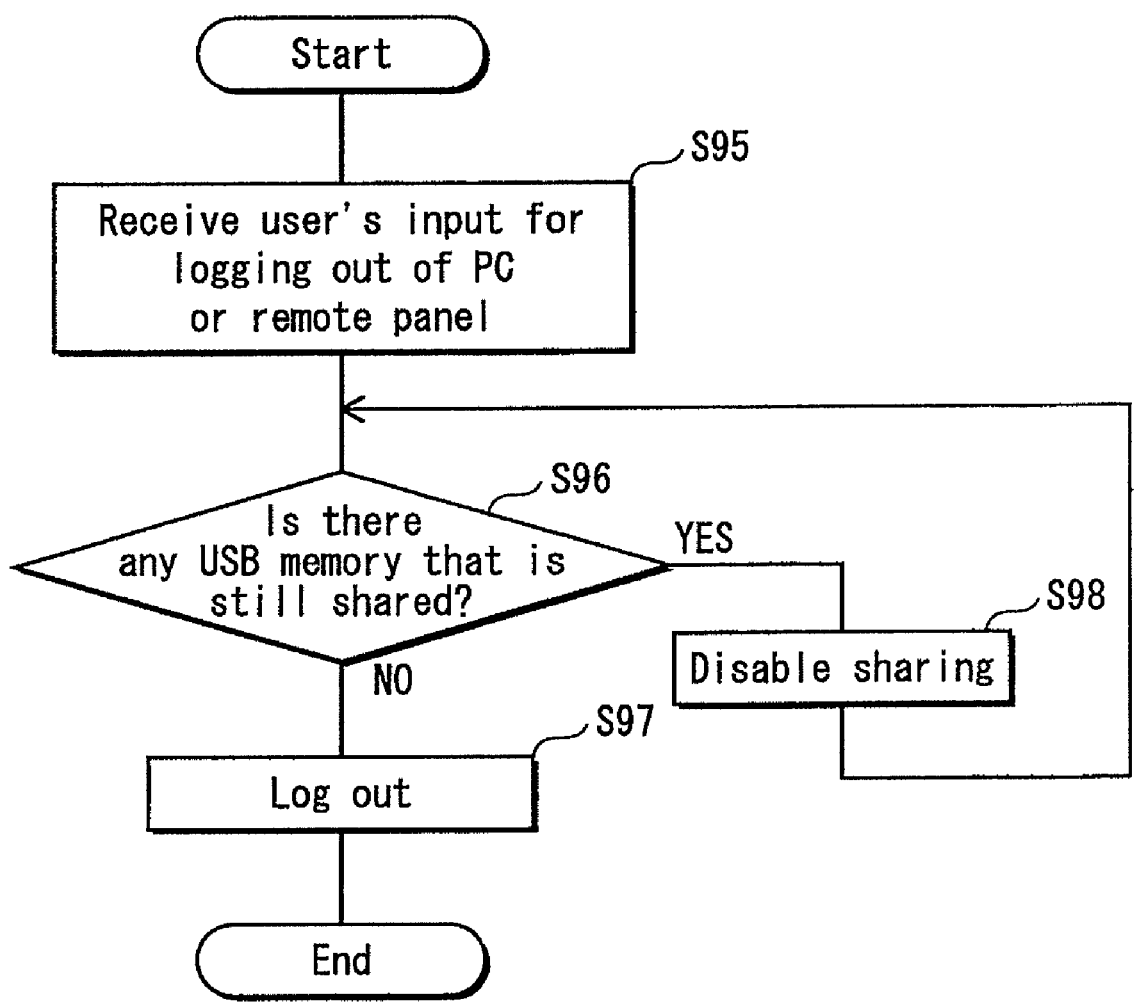
FIG. 17 is a flowchart of processing performed by the PC when the user, who is remotely logged in to the MFP, returns from the MFP to the PC and attempts to log out of the PC.

FIG. 17 is a flowchart of processing performed by the PC 2 when the user, who is remotely logged in to the MFP 1, returns from the MFP 1 to the PC 2 and attempts to log out of the PC 2.

As shown in FIG. 17, when the PC 2 has received user's input for logging out of the PC 2 or the remote panel via the keyboard 23 or the like (Step S95), the PC 2 judges whether any of the USB memories connected to itself is configured as shared (Step S96). When judging that one or more of the USB memories are configured as shared (the "YES" branch of Step S96), the PC 2 disables sharing of one of these USB memories (Step S98), and returns to Step S96.

In Step S96, the PC 2 again judges whether any of the USB memories connected to itself is configured as shared. If the PC 2 judges that one or more of the USB memories are configured as shared, the PC 2 returns to Step S98 and disables sharing of one of these USB memories. If the PC 2 judges that none of the USB memories is configured as shared (the "NO" branch of Step S96), the PC 2 judges that sharing of every USB memory connected thereto has been disabled. After the logout from the PC 2 or the remote panel has been performed (Step S97), the PC 2 terminates the processing of FIG. 17. Consequently, the communication between the PC 2 and the MFP 1, which had been established due to the PC 2 remotely logging in to the MFP 1, is disconnected. It should be noted that the communication between the PC 2 and the MFP 1 may be automatically disconnected upon timeout (when a predetermine time period has elapsed since the remote login was performed).

As has been described above, when the user who is remotely logged in to the MFP 1 again logs in to the MFP 1 via the operation panel 15 and instructs the MFP 1 to execute memory printing, the MFP 1 accesses the PC 2 using the network address of the PC 2, which is acquired when the user remotely logged in to the MFP 1. This way, the MFP 1 can acquire information on USB memories connected to the PC 2, information on files stored in the USB memories, and the files. This saves the user the conventionally-needed trouble of inputting the network address of the PC 2 and the like when accessing shared resources of the PC 2 from the MFP 1, thus improving operability of the MFP 1.

The present invention is not limited to being applied to an image processing system, but may also be applied to an image processing apparatus and a terminal device included in the image processing system. The present invention may also provide a method of acquiring a file or a method of storing a file in the image processing system (the latter method will be described later). Furthermore, the present invention may also provide a program that causes a computer to execute these methods. The program of the present invention may be recorded on a computer-readable recording medium, such as a magnetic tape, a magnetic disk (e.g., a flexible disk), an optical recording medium (e.g., DVD-ROM, DVD-RAM, CR-ROM, CD-R, MO and PD), and a recording medium of a flash memory type. The program may be produced, sold, etc. after having been recorded on the above recording medium, or may be transmitted and provided in the form of a program via, for example, various types of wired/wireless networks (e.g., the Internet), broadcasting, telecommunication lines, and satellite communications.

MODIFICATION EXAMPLES

The present invention has been described above based on the embodiment thereof. However, it goes without saying that the present invention is not limited to the above embodiment. The following modification examples are also possible.

(1) The present invention has been described above as being applied to memory printing. However, the present invention may similarly be applied to a scan job. For example, if the user selects "Scan" on the job selection screen 111 shown in FIG. 4A, then the liquid crystal display displays a screen via which the user can select a method of storing an image file obtained by scanning the document. This screen has the same design as, for example, the file storage selection screen 112, and shows an icon of USB memory.

Once the user has selected the USB memory, the liquid crystal display displays a screen via which the user can select USB memory into which the image file should be stored. This screen has the same design as, for example, the USB memory selection screen 113, and shows an icon of the USB memory 25 connected to the PC 2. This screen is displayed by the MFP 1 performing the processing of the aforementioned Steps S40 onward.

When the user selects the USB memory 25 connected to the PC 2, the liquid crystal display displays a file selection screen (Step S101, described later), which (i) has the same design as, for example, the file selection screen 114, and (ii) shows an icon of a file obtained through the scan job. The user can select the file via this file selection screen.

When the user selects the file (Step S102, described later), the selected file (a file of the scanned image) is transmitted to the PC 2 via the LAN 3, and stored into the USB memory 25 connected to the PC 2 (Step S103, described later). This job is referred to as Scan To USB.

Figure 18:
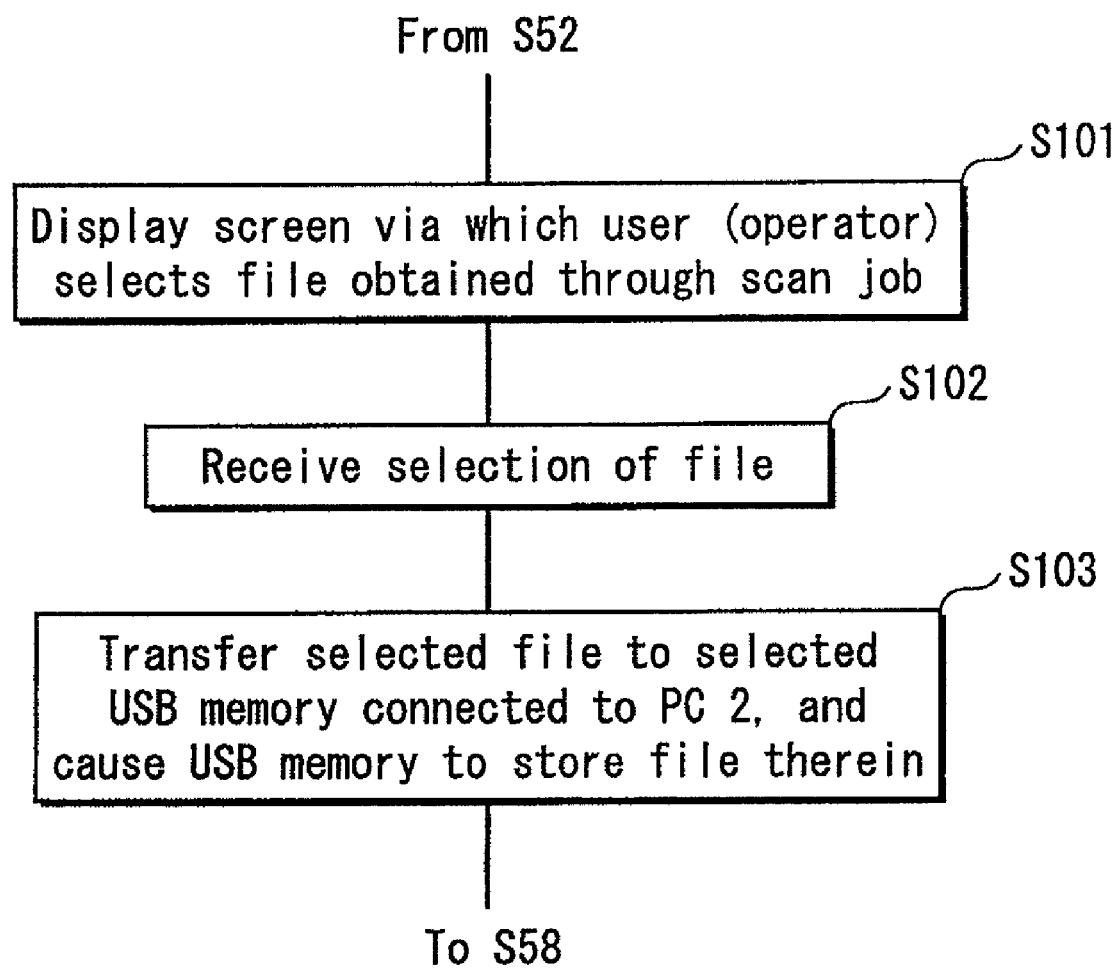
FIG. 18 is a flowchart of a part of processing performed by the MFP when the user (operator) has selected Scan To USB.

FIG. 18 is a flowchart of a part of processing performed by the MFP 1 when the user (operator) has selected Scan To USB. The flowchart of FIG. 18 selectively shows the part of processing that is different from processing performed in the case of memory printing.

More specifically, when the user (operator) has selected Scan To USB, the MFP 1 performs processing of Steps S101 to S103 shown in FIG. 18 in place of processing of Steps S53 to S57 shown in FIGS. 9 and 10.

In Step S101, which follows Step S52, the MFP 1 causes the operation panel 53 to display a screen via which the user (operator) selects a file obtained through the scan job.

In Step S102, the MFP 1 receives selection of the file from the user (operator).

In Step S103, the MFP 1 (i) transmits the selected file via the LAN 3 to the USB memory 25, which is made accessible in Step S52, selected by the user (operator), and connected to the PC 2, and (ii) causes the USB memory 25 to store the transmitted file therein. Thereafter, the MFP 1 proceeds to Step S58.

(2) According to the above embodiment, input of a user ID and password is required both when the user logs in to the MFP 1 via the operation panel 15 thereof and when the user remotely logs in to the MFP 1 from the PC 2. However, the present invention is not limited to this structure, as long as the MFP 1 can judge whether the logins should be permitted based on some kind of user identification. Furthermore, it has been described above that the MFP 1 requests the PC 2 to configure USB memory connected thereto as shared. However, as some recording media have already been configured as shared from the start, the MFP 1 may, for example, (i) confirm share settings of the USB memory with the PC 2 at first, and (ii) if the USB memory is not shared, request the PC 2 to configure the USE memory as shared. Alternatively, instead of requesting the PC 2 to configure the USB memory as shared, the MFP 1 may, for example, (i) request the PC 2 to permit the MFP 1 to access the USB memory at first, and (ii) if the access is permitted, access the USB memory to either acquire a file therefrom or store a file thereinto.

(3) The above embodiment has described an exemplary case where portable USB memory 25 is used as a representative example of a recording medium loaded in the terminal device. However, the recording medium loaded in the terminal device is not limited to the portable USB memory 25. For instance, the recording medium loaded in the terminal device may be an SD memory card or SmartMedia. Alternatively, the recording medium loaded in the terminal device may be a hard disk drive if it is built in the MFP 1.

In a case where the recording medium loaded in the terminal device is the hard disk drive, the file storage selection screen 112 should be configured to display the hard disk drive instead of USB memory, so the user can select the hard disk drive as storage from which a file should be acquired. Similarly, the USB memory selection screen 113 should be configured to display the hard disk drives respectively built in the MFP 1 and PC 2 instead of USB memories, so the user can select one of these hard disk drives. When the user selects the hard disk drive built in the PC 2, the MFP 1 should cause the file selection screen 114 to display, from among folders/files stored in the hard disk drive built in the PC 2, one or more folders/files that are configured as shared, so the user can select a file he/she desires from among the displayed folders/files.

(4) As illustrated in FIG. 4A, the MFP 1 according to the above embodiment is structured as follows. When USB memory is selected on the file storage selection screen 112, the file storage selection screen 112 is switched to the USB memory selection screen 113. When the PC/USB memory button 123 is touched on the USB memory selection screen 113, the USB memory selection screen 113 is switched to the file selection screen 114. The present invention, however, is not limited to this structure. For example, there may be a case where the MFP 1 is not able to connect to USB memory. In this case, when USB memory is selected on the file storage selection screen 112, the MFP 1 may judge that the selected USB memory is connected to an external terminal device and skip display of the USB memory selection screen 113—i.e., switch directly from the file storage selection screen 112 to the file selection screen 114. Note, in this case, it is not necessary to perform the processing of the aforementioned Steps S35 and S36. This further simplifies operator's inputs, thus improving operability of the MFP 1 to a greater extent.

(5) The above embodiment has described an exemplary case where the image processing apparatus of the present invention is applied to a photocopier. However, the image processing apparatus of the present invention is not limited to being applied to a photocopier. The image processing apparatus of the present invention may be connected to a terminal device via a network, and be able to perform at least one of image processing jobs, such as: (i) a print job of acquiring, via the network, a file stored in a recording medium loaded in the terminal device, and forming an image according to the acquired file; and (ii) a scan job of transmitting a file that is obtained by the image processing apparatus reading a document to the terminal device via the network, and having the file stored in a recording medium loaded in the terminal device. Examples of such an image processing apparatus include a printer, scanner, and facsimile machine. Also, it has been exemplarily described in the above embodiment that the operation panel 15 serves as input means for receiving, from an operator, a login and instructional input for instructing an image processing job. However, the present invention is not limited to such a structure. The operation panel 15 may be replaced by any general input means that has a function of receiving input from the operator.

The present invention may be implemented based on any combination of the above embodiment and modification examples.

(Conclusion)

The above embodiment and modification examples represent aspects of the present invention that solve the problems mentioned earlier in "(2) Description of the Related Art". The above embodiment and modification examples are summarized as follows.

A first aspect of the present invention is an image processing apparatus that (i) is connected via a network to a terminal device having a recording medium loaded therein, (ii) receives a remote login from the terminal device, and (iii) executes an image processing job, the image processing apparatus comprising: a storage part that stores therein (i) a network address of the terminal device and (ii) identification information pieces of a user who has requested the remote login, which are both acquired upon the remote login; an input part operable to receive, from an operator, (i) an operator login and (ii) input for instructing the job; an acquisition part operable to acquire identification information pieces of the operator who has performed the operator login; a judgment part operable to, based on the identification information pieces of the user and the operator, judge whether or not the operator is the same person as the user who is remotely logged in to the apparatus from the terminal device; and a file operation part operable to, when the judgment is affirmative, perform one of operations A and B according to the input after the apparatus is granted access permission by the terminal device with use of the network address, the operation A being to acquire an image file stored in the recording medium, the operation B being to cause an image file stored in the apparatus to be stored in the recording medium.

A second aspect of the present invention is the image processing apparatus of the first aspect further comprising a request part operable to request the terminal device to grant the apparatus the access permission, which allows the apparatus to access the recording medium, wherein the file operation part performs one of the operations A and B after the terminal device has granted the apparatus the access permission.

A third aspect of the present invention is the image processing apparatus of the second aspect, wherein the input part includes a display, the file operation part is further operable to (i) cause the display to display a first screen via which the operator designates the recording medium, and (ii) receive the designation from the operator via the first screen, and the file operation part performs one of the operations A and B with respect to the designated recording medium.

A fourth aspect of the present invention is the image processing apparatus of the third aspect, wherein in addition to the recording medium, at least one other recording medium is loaded in the terminal device, the request part requests the terminal device to grant the apparatus the access permission to access each of the recording media, and when the terminal device has granted the apparatus the access permission, the file operation part is further operable to cause the first screen to display identification information pieces that respectively show the recording media.

A fifth aspect of the present invention is the image processing apparatus of the third aspect, wherein in addition to the recording medium, at least one other recording medium is loaded in the terminal device, the file operation part is further operable to (i) prior to the display of the first screen, cause the display to display a second screen via which the operator selects one or more of the recording media, and (ii) upon receiving the selection, cause the first screen to display identification information pieces that respectively show the selected one or more of the recording media, and the request part requests the terminal device to grant the apparatus the access permission to access only the selected one or more of the recording media.

A sixth aspect of the present invention is the image processing device of the second aspect, wherein in a case where the terminal device grants the apparatus the access permission when a password transmitted from the apparatus matches a password set by the terminal device, the file operation part is further operable to (i) acquire the password set by the terminal device from the terminal device, and (ii) transmit the acquired password to the terminal device when the request part requests the terminal device to grant the apparatus the access permission, and the file operation part performs one of the operations A and B after the terminal device has granted the apparatus the access permission.

A seventh aspect of the present invention is the image processing apparatus of the second aspect, wherein the request part requests the terminal device to grant the apparatus the access permission after the judgment part has judged in the affirmative.

An eighth aspect of the present invention is the image processing apparatus of the first aspect, wherein the access permission allows the apparatus to share the recording medium with the terminal device.

A ninth aspect of the present invention is the image processing apparatus of the second aspect, wherein the access permission allows the apparatus to share the recording medium with the terminal device, the input part is further operable to receive, from the operator, logout input for logging out of the apparatus, and when the logout input has been received, the request part is further operable to request the terminal device to disable the sharing of the recording medium.

A tenth aspect of the present invention is the image processing apparatus of the first aspect, wherein the recording medium is a portable and removable recording medium.

An eleventh aspect of the present invention is an image processing system including a terminal device having a recording medium loaded therein and an image processing apparatus that is connected to the terminal device via a network, receives a remote login from the terminal device and executes an image processing job, the image processing apparatus comprising: a storage part that stores therein (i) a network address of the terminal device and (ii) identification information pieces of a user who has requested the remote login, which are both acquired upon the remote login; an input part operable to receive, from an operator, (i) an operator login and (ii) input for instructing the job; an acquisition part operable to acquire identification information pieces of the operator who has performed the operator login; a judgment part operable to, based on the identification information pieces of the user and the operator, judge whether or not the operator is the same person as the user who is remotely logged in to the apparatus from the terminal device; and a file operation part operable to, when the judgment is affirmative, perform one of operations A and B according to the input after the apparatus is granted access permission by the terminal device with use of the network address, the operation A being to acquire an image file stored in the recording medium, the operation B being to cause an image file stored in the apparatus to be stored in the recording medium.

A twelfth aspect of the present invention is the image processing system of the eleventh aspect, wherein the image processing apparatus further comprises a request part operable to request the terminal device to grant the apparatus the access permission, which allows the apparatus to access the recording medium, and the file operation part performs one of the operations A and B after the terminal device has granted the apparatus the access permission.

A thirteenth aspect of the present invention is the image processing system of the twelfth aspect, wherein the input part includes a display, the file operation part is further operable to (i) cause the display to display a first screen via which the operator designates the recording medium, and (ii) receive the designation from the operator via the first screen, and the file operation part performs one of the operations A and B with respect to the designated recording medium.

A fourteenth aspect of the present invention is the image processing system of the thirteenth aspect, wherein in addition to the recording medium, at least one other recording medium is loaded in the terminal device, the request part requests the terminal device to grant the apparatus the access permission to access each of the recording media, and when the terminal device has granted the apparatus the access permission, the file operation part is further operable to cause the first screen to display identification information pieces that respectively show the recording media.

A fifteenth aspect of the present invention is the image processing system of the thirteenth aspect, wherein in addition to the recording medium, at least one other recording medium is loaded in the terminal device, the file operation part is further operable to (i) prior to the display of the first screen, cause the display to display a second screen via which the operator selects one or more of the recording media, and (ii) upon receiving the selection, cause the first screen to display identification information pieces that respectively show the selected one or more of the recording media, and the request part requests the terminal device to grant the apparatus the access permission to access only the selected one or more of the recording media.

A sixteenth aspect of the present invention is the image processing system of the twelfth aspect, wherein in a case where the terminal device grants the apparatus the access permission when a password transmitted from the apparatus matches a password set by the terminal device, the file operation part is further operable to (i) acquire the password set by the terminal device from the terminal device, and (ii) transmit the acquired password to the terminal device when the request part requests the terminal device to grant the apparatus the access permission, and the file operation part performs one of the operations A and B after the terminal device has granted the apparatus the access permission.

A seventeenth aspect of the present invention is the image processing system of the twelfth aspect, wherein the request part requests the terminal device to grant the apparatus the access permission after the judgment part has judged in the affirmative.

An eighteenth aspect of the present invention is the image processing system of the eleventh aspect, wherein the access permission allows the apparatus to share the recording medium with the terminal device.

A nineteenth aspect of the present invention is the image processing system of the twelfth aspect, wherein the access permission allows the apparatus to share the recording medium with the terminal device, the input part is further operable to receive, from the operator, logout input for logging out of the apparatus, and when the logout input has been received, the request part is further operable to request the terminal device to disable the sharing of the recording medium.

A twentieth aspect of the present invention is the image processing system of the eleventh aspect, wherein the recording medium is a portable and removable recording medium.

Assume a case where the image processing apparatus accesses the terminal device after the user, who is remotely logged in to the image processing apparatus from the terminal device, (i) moves to the front of the image processing apparatus, (ii) logs in to the image processing apparatus this time via the input part of the image processing apparatus, and (ii) instructs the image processing apparatus to execute an image processing job. In this case, if the image processing job denotes acquisition of a file, then the above-described image processing apparatus acquires a file from the recording medium loaded in the terminal device. On the other hand, if the image processing job denotes storing of a file, then the above-described image processing apparatus stores a file into the recording medium loaded in the terminal device. Therefore, the above-described image processing apparatus saves the user the conventionally-needed trouble of inputting a network address, user name, password, etc. via the input part of the image processing apparatus when accessing the terminal device. That is to say, the above structure improves operability of the image processing apparatus.

Industrial Applicability

The present invention is widely applicable to an image processing system including a terminal device and an image processing apparatus that are connected to each other via a network, the terminal device causing the image processing apparatus to execute an image processing job by remotely logging in to the image processing apparatus. The present invention is widely applicable to such an image processing apparatus as well.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus that (i) is connected via a network to a terminal device, (ii) receives a remote login from the terminal device, and (iii) executes an image processing job, the image processing apparatus comprising:
 a storage part that stores therein (i) a network address of the terminal device and (ii) identification information pieces of a user who has requested the remote login, which are both acquired upon the remote login;
 an input part operable to receive, from a user who operates the apparatus, (i) a login and (ii) input for instructing the job;
 an acquisition part operable to acquire identification information pieces of the user who has performed the login by operating the apparatus;
 a judgment part operable to, based on the identification information pieces of the user who has requested the remote login and the identification information pieces of the user who has performed the login by operating the apparatus, judge whether or not the user who operates the apparatus is the same person as the user who has requested the remote login from the terminal device and is remotely logged in to the apparatus;
 a file operation part operable to, when the judgment is affirmative, perform one of operations A and B according to the input after the apparatus is granted access permission by the terminal device with use of the network address, the operation A being to acquire an image file stored in a recording medium loaded in the terminal device, the operation B being to cause an image file stored in the apparatus to be stored in the recording medium loaded in the terminal device; and
 a request part operable to request the terminal device to grant the apparatus the access permission, which allows the apparatus to access the recording medium loaded in the terminal device, wherein
 the file operation part performs one of the operations A and B after the terminal device has granted the apparatus the access permission,
 the input part includes a display,
 the file operation part is further operable to (i) cause the display to display a first screen via which the user who operates the apparatus designates the recording medium loaded in the terminal device, and (ii) receive the designation from the user who operates the apparatus via the first screen,
 the file operation part performs one of the operations A and B with respect to the designated recording medium,
 in addition to the recording medium loaded in the terminal device, at least one other recording medium is loaded in the terminal device,
 the file operation part is further operable to (i) prior to the display of the first screen, cause the display to display a second screen via which the user who operates the apparatus selects one or more of the recording media loaded in the terminal device, and (ii) upon receiving the selection, cause the first screen to display identification information pieces that respectively show the selected one or more of the recording media, and
 the request part requests the terminal device to grant the apparatus the access permission to access only the selected one or more of the recording media.

2. The image processing apparatus of claim 1, wherein
 in addition to the recording medium loaded in the terminal device, at least one other recording medium is loaded in the terminal device,
 the request part requests the terminal device to grant the apparatus the access permission to access each of the recording media loaded in the terminal device, and
 when the terminal device has granted the apparatus the access permission, the file operation part is further operable to cause the first screen to display identification information pieces that respectively show the recording media loaded in the terminal device.

3. The image processing apparatus of claim 1, wherein
 in a case where the terminal device grants the apparatus the access permission when a password transmitted from the apparatus matches a password set by the terminal device, the file operation part is further operable to (i) acquire the password set by the terminal device from the terminal device, and (ii) transmit the acquired password to the terminal device when the request part requests the terminal device to grant the apparatus the access permission, and
 the file operation part performs one of the operations A and B after the terminal device has granted the apparatus the access permission.

4. The image processing apparatus of claim 1, wherein
the request part requests the terminal device to grant the apparatus the access permission after the judgment part has judged in the affirmative.

5. The image processing apparatus of claim 1, wherein
the access permission allows the apparatus to share the recording medium loaded in the terminal device with the terminal device.

6. The image processing apparatus of claim 5, wherein
the input part is further operable to receive, from the user who operates the apparatus, logout input for logging out of the apparatus, and
when the logout input has been received, the request part is further operable to request the terminal device to disable the sharing of the recording medium loaded in the terminal device.

7. The image processing apparatus of claim 1, wherein the recording medium loaded in the terminal device is a portable and removable recording medium.

8. An image processing system including:
a terminal device; and
an image processing apparatus that is connected to the terminal device via a network, receives a remote login from the terminal device and performs an image processing job,
the image processing apparatus comprising:
a storage part that stores therein (i) a network address of the terminal device and (ii) identification information pieces of a user who has requested the remote login, which are both acquired upon the remote login;
an input part operable to receive, from a user who operates the apparatus, (i) a login and (ii) input for instructing the job;
an acquisition part operable to acquire identification information pieces of the user who has performed the login by operating the apparatus;
a judgment part operable to, based on the identification information pieces of the user who has requested the remote login and the identification information pieces of the user who has performed the login by operating the apparatus, judge whether or not the user who operates the apparatus is the same person as the user who has requested the remote login from the terminal device and is remotely logged in to the apparatus; and
a file operation part operable to, when the judgment is affirmative, perform one of operations A and B according to the input after the apparatus is granted access permission by the terminal device with use of the network address, the operation A being to acquire an image file stored in a recording medium loaded in the terminal device, the operation B being to cause an image file stored in the apparatus to be stored in the recording medium loaded in the terminal device,
wherein the image processing apparatus further comprises a request part operable to request the terminal device to grant the apparatus the access permission, which allows the apparatus to access the recording medium loaded in the terminal device,
the file operation part performs one of the operations A and B after the terminal device has granted the apparatus the access permission,
the input part includes a display,
the file operation part is further operable to (i) cause the display to display a first screen via which the user who operates the apparatus designates the recording medium loaded in the terminal device and (ii) receive the designation from the user who operates the apparatus via the first screen,
the file operation part performs one of the operations A and B with respect to the designated recording medium,
in addition to the recording medium loaded in the terminal device, at least one other recording medium is loaded in the terminal device,
the file operation part is further operable to (i) prior to the display of the first screen, cause the display to display a second screen via which the user who operates the apparatus selects one or more of the recording media loaded in the terminal device, and (ii) upon receiving the selection, cause the first screen to display identification information pieces that respectively show the selected one or more of the recording media, and
the request part requests the terminal device to grant the apparatus the access permission to access only the selected one or more of the recording media.

9. The image processing system of claim 8, wherein
in addition to the recording medium loaded in the terminal device, at least one other recording medium is loaded in the terminal device,
the request part requests the terminal device to grant the apparatus the access permission to access each of the recording media loaded in the terminal device, and
when the terminal device has granted the apparatus the access permission, the file operation part is further operable to cause the first screen to display identification information pieces that respectively show the recording media loaded in the terminal device.

10. The image processing system of claim 8, wherein
in a case where the terminal device grants the apparatus the access permission when a password transmitted from the apparatus matches a password set by the terminal device, the file operation part is further operable to (i) acquire the password set by the terminal device from the terminal device, and (ii) transmit the acquired password to the terminal device when the request part requests the terminal device to grant the apparatus the access permission, and
the file operation part performs one of the operations A and B after the terminal device as granted the apparatus the access permission.

11. The image processing system of claim 8, wherein
the request part requests the terminal device to grant the apparatus the access permission after the judgment part has judged in the affirmative.

12. The image processing system of claim 8, wherein
the access permission allows the apparatus to share the recording medium loaded in the terminal device with the terminal device.

13. The image processing system of claim 12, wherein
the input part is further operable to receive, from the user who operates the apparatus, logout input for logging out of the apparatus, and
when the logout input has been received, the request part is further operable to request the terminal device to disable the sharing of the recording medium loaded in the terminal device.

14. The image processing system of claim 8, wherein
the recording medium loaded in the terminal device is a portable and removable recording medium.

* * * * *